United States Patent
Ito et al.

(10) Patent No.: US 10,362,613 B2
(45) Date of Patent: Jul. 23, 2019

(54) PAIRING MANAGEMENT METHOD, RECORDING MEDIUM, AND TERMINAL APPARATUS

(71) Applicant: FUJITSU LIMITED, Kawasaki-shi, Kanagawa (JP)

(72) Inventors: Hidenobu Ito, Kawasaki (JP); Kazuaki Nimura, Kawasaki (JP); Koichi Yasaki, Kawasaki (JP); Takuya Sakamoto, Kawasaki (JP); Yosuke Nakamura, Kawasaki (JP); Junya Kani, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 28 days.

(21) Appl. No.: 15/498,077

(22) Filed: Apr. 26, 2017

(65) Prior Publication Data

US 2017/0231022 A1    Aug. 10, 2017

Related U.S. Application Data

(63) Continuation of application No. PCT/JP2014/081801, filed on Dec. 1, 2014.

(51) Int. Cl.
*H04W 12/06* (2009.01)
*H04W 76/14* (2018.01)
(Continued)

(52) U.S. Cl.
CPC .......... *H04W 76/14* (2018.02); *H04L 63/061* (2013.01); *H04L 63/062* (2013.01);
(Continued)

(58) Field of Classification Search
CPC ..... H04W 76/14; H04W 12/06; H04W 12/04; H04W 4/80; H04W 76/10; H04W 92/08;
(Continued)

(56) References Cited

U.S. PATENT DOCUMENTS 8,271,662 B1 *  9/2012  Gossweiler ......... H04M 1/6066
                                                    709/227
9,716,855 B2 *  7/2017  Gehring ................. H04N 5/782
(Continued)

FOREIGN PATENT DOCUMENTS

EP    1233570 A1    8/2002
EP    1492302 A2    12/2004
(Continued)

OTHER PUBLICATIONS

International Search Report dated Feb. 24, 2015 in corresponding International Application No. PCT/JP2014/081801.
(Continued)

*Primary Examiner* — Lan-Huong Truong
(74) *Attorney, Agent, or Firm* — Staas & Halsey LLP

(57) ABSTRACT

A pairing management method includes detecting, by a computer, a peripheral device configured to perform short-range wireless communication with the computer; transmitting, by the computer, to a server storing pairing information generated by a pairing process of a management terminal and the peripheral device, an acquisition request for the pairing information of the detected peripheral device; and performing data communication, by the computer, with the detected peripheral device, based on the pairing information, when the pairing information associated with the transmitted acquisition request is received from the server.

11 Claims, 31 Drawing Sheets

(51) Int. Cl.
| | |
|---|---|
| *H04W 76/10* | (2018.01) |
| *H04W 92/08* | (2009.01) |
| *H04W 4/80* | (2018.01) |
| *H04L 29/06* | (2006.01) |
| *H04L 29/08* | (2006.01) |
| *H04W 12/04* | (2009.01) |
| *G06K 7/14* | (2006.01) |
| *H04W 8/00* | (2009.01) |

(52) U.S. Cl.
CPC .......... *H04L 63/0869* (2013.01); *H04L 67/34* (2013.01); *H04L 67/42* (2013.01); *H04W 4/80* (2018.02); *H04W 12/04* (2013.01); *H04W 12/06* (2013.01); *H04W 76/10* (2018.02); *H04W 92/08* (2013.01); *G06K 7/1434* (2013.01); *H04W 8/005* (2013.01)

(58) Field of Classification Search
CPC .... H04W 8/005; H04L 67/42; H04L 63/0869; H04L 63/061; H04L 63/062; H04L 67/34; G06K 7/1434
See application file for complete search history.

(56) References Cited

U.S. PATENT DOCUMENTS

| | | | | |
|---|---|---|---|---|
| 2003/0051146 | A1* | 3/2003 | Ebina | H04L 63/0428 713/185 |
| 2006/0191000 | A1* | 8/2006 | O'Hara, Jr. | H04L 63/062 726/12 |
| 2006/0250980 | A1* | 11/2006 | Pereira | H04L 12/2803 370/254 |
| 2007/0186105 | A1* | 8/2007 | Bailey | H04L 63/0492 713/168 |
| 2011/0119491 | A1* | 5/2011 | Nocera | H04L 9/3226 713/170 |
| 2012/0171951 | A1* | 7/2012 | 't Hooft | H04M 1/7253 455/41.1 |
| 2012/0324076 | A1* | 12/2012 | Zerr | H04W 4/21 709/223 |
| 2013/0095753 | A1* | 4/2013 | Chen | H04W 76/10 455/41.1 |
| 2013/0288604 | A1 | 10/2013 | Chang et al. | |
| 2014/0019304 | A1 | 1/2014 | Lee et al. | |
| 2015/0095651 | A1* | 4/2015 | Kato | H04L 63/062 713/176 |
| 2015/0250021 | A1* | 9/2015 | Stice | H04W 76/14 710/16 |

FOREIGN PATENT DOCUMENTS

| | | |
|---|---|---|
| JP | 2009-278388 | 11/2009 |
| JP | 2013-541886 | 11/2013 |
| JP | 2014-127729 | 7/2014 |

OTHER PUBLICATIONS

Extended European Search Report dated Dec. 5, 2017 in corresponding European Patent Application No. 14907536.8.

* cited by examiner

| TERMINAL ADDRESS | DEVICE ADDRESS | DEVICE NAME | PAIRING KEY |
|---|---|---|---|
| E3:F1:12:00:BB:92 | BC:F5:E3:17:0B:FC | PRINTER_FJ | a2981bc24d7ea···d0a20 |
| E3:F1:12:00:D8:25 | D5:FF:00:A3:64:BD | HRM90 | 32dd8c75aef35···d842bf |

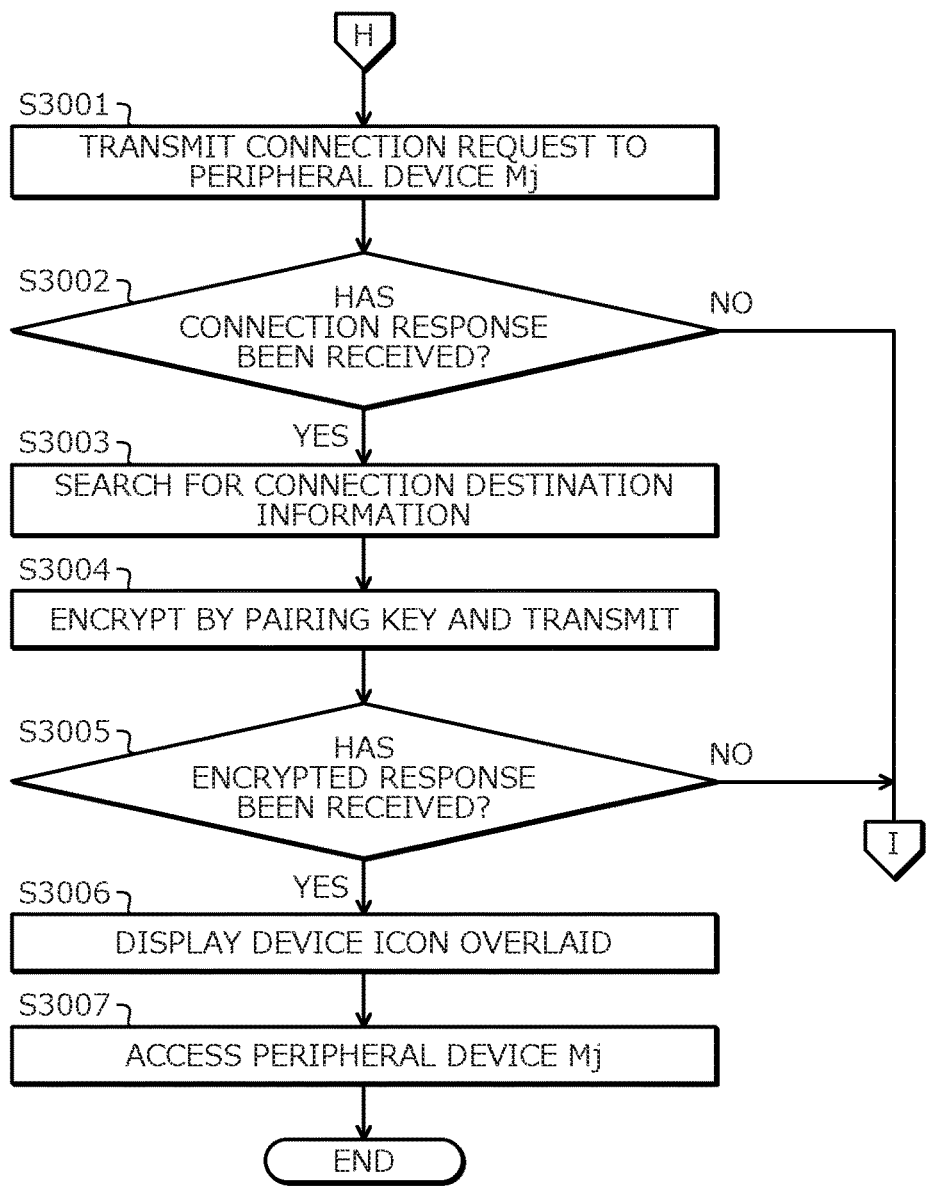

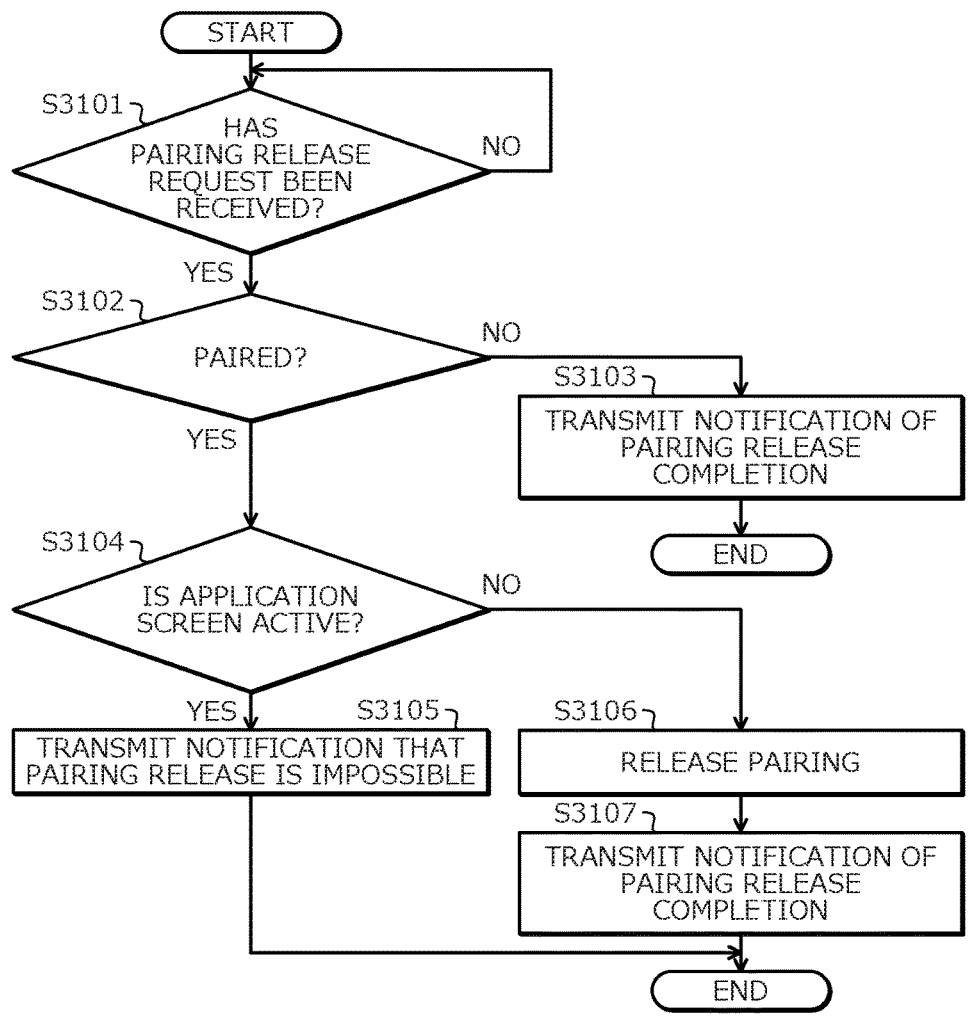

PAIRING MANAGEMENT METHOD, RECORDING MEDIUM, AND TERMINAL APPARATUS

CROSS REFERENCE TO RELATED APPLICATIONS

This application is a continuation application of International Application PCT/JP2014/081801, filed on Dec. 1, 2014, and designating the U.S., the entire contents of which are incorporated herein by reference.

FIELD

Embodiments discussed herein relate to a pairing management method, a recording medium, and a terminal apparatus.

BACKGROUND

Various devices have become equipped with wireless functions and are capable of connecting to networks, often called interconnecting of "things" (Internet of things). For example, wireless local area networks (LANs), Bluetooth (registered trademark), near field communication (NFC), and the like are used as a wireless means of connecting peripheral devices and smartphones, tablet terminals, etc.

Devices wirelessly connected cannot be visually discerned like with a wired connection and therefore, an operation called pairing (or bonding) of devices to be connected is performed. Pairing enables a user to recognize which devices are connected by performing a particular operation at the time of the initial connection. Pairing further prevents inadvertent connection with a non-paired device.

There are numerous methods for the pairing operation. A typical method involves establishing a connection between devices by a physical pressing of a button provided on a device. Another method involves displaying a passcode on a device equipped with a display and input of the passcode at another device whereby the connection counterpart is recognized. Yet another method involves using NFC whereby devices are recognized when brought into proximity of each other.

For example, there is a known technique for enabling communication between arbitrary devices. In the technique, a management apparatus receives from other communications apparatuses via authentication infrastructure, terminal identification information of the communications terminal apparatuses, generates a shared key, and transmits the shared key to the other communications apparatuses via the authentication infrastructure. Further, the management apparatus receives from a communications terminal apparatus, an encrypted communication request, uses the shared key to decrypt the communication request, and after authenticating the communications terminal apparatus, uses the shared key to encrypt network information of the other communications apparatuses based on the communication request, and transmits the encrypted network information to the transmission source of the communication request.

There is a further technique that when a Bluetooth device successfully pairs with a terminal device among terminal devices having the same device information, enables the Bluetooth device to connect to another terminal device without performing pairing procedures and to transmit and receive data through Bluetooth communication. For examples, refer to Japanese Laid-Open Patent Publication No. 2009-278388 and Published Japanese-Translation of PCT Application, Publication No. 2013-541886.

SUMMARY

According to an aspect of an embodiment, a pairing management method includes detecting, by a computer, a peripheral device configured to perform short-range wireless communication with the computer; transmitting, by the computer, to a server storing pairing information generated by a pairing process of a management terminal and the peripheral device, an acquisition request for the pairing information of the detected peripheral device; and performing data communication, by the computer, with the detected peripheral device, based on the pairing information, when the pairing information associated with the transmitted acquisition request is received from the server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 30 is a flowchart (part 2) of the example of the second pairing management process procedure of the user terminal Ti according to the third embodiment; and FIG. 31 is a flowchart of an example of a third pairing management process procedure of the user terminal Ti according to the third embodiment.

DESCRIPTION OF THE INVENTION

Embodiments of a pairing management method, a pairing management program, and a terminal apparatus according to the present invention will be described in detail with reference to the accompanying drawings.

Figure 1:
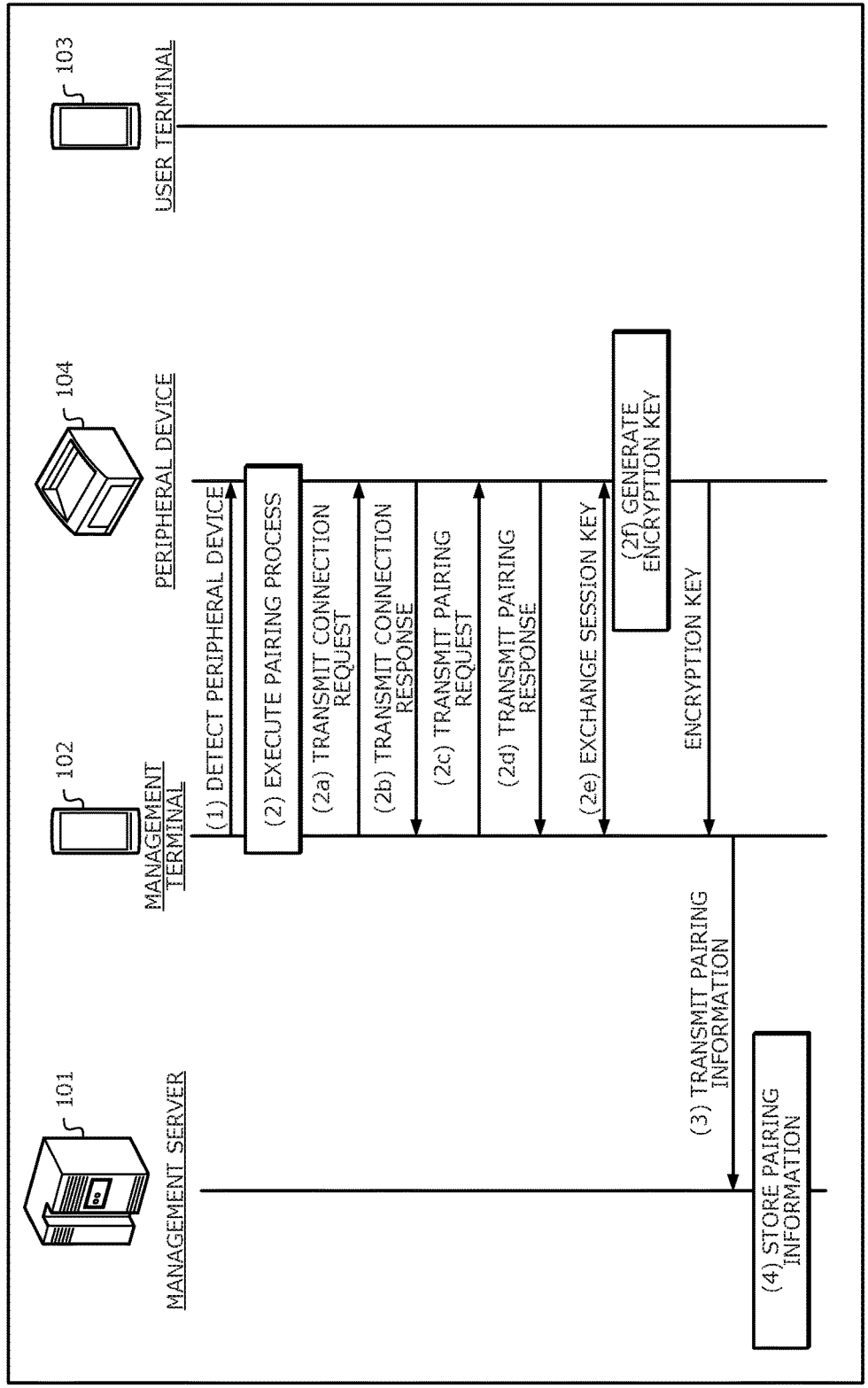
FIG. 1 is a sequence diagram (part 1) of an example of a pairing management method according to a first embodiment.
Figure 2:
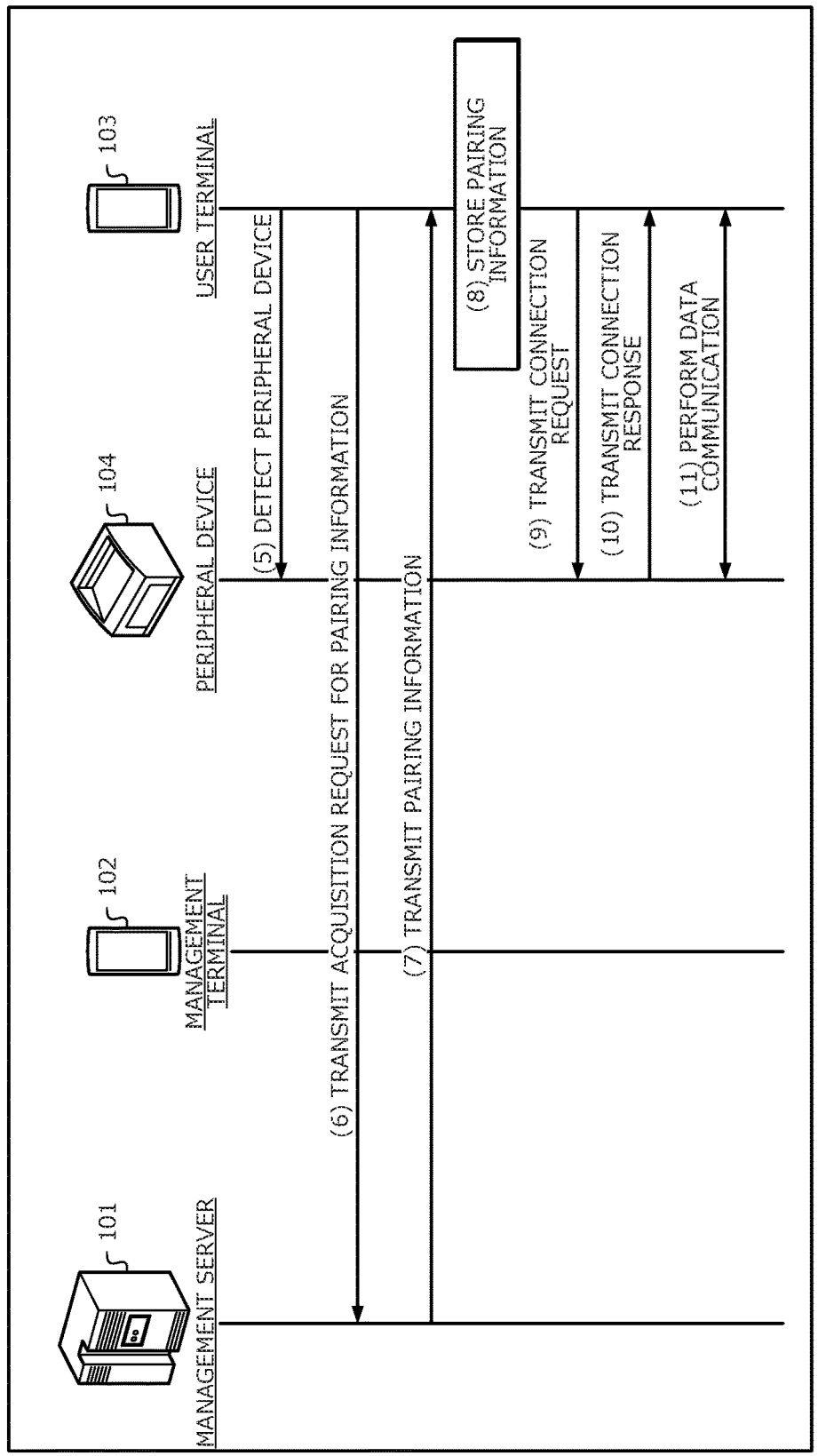
FIG. 2 is a sequence diagram (part 2) of the example of the pairing management method according to the first embodiment.

FIGS. 1 and 2 are sequence diagrams of an example of the pairing management method according to a first embodiment. In FIGS. 1 and 2, a management server 101 is a computer configured to manage pairing information generated by a pairing process of a management terminal 102 and a peripheral device 104.

The management terminal 102 is a computer configured to support short-range wireless communication. Further, a user terminal 103 is a computer configured to support short-range wireless communication. The management terminal 102 and the user terminal 103, for example, may be a smartphone, a mobile telephone, a tablet terminal, a note personal computer (PC), a PC, or the like.

The management terminal 102 is used by a manager of the peripheral device 104. The user terminal 103 is used by a user of the peripheral device 104. The peripheral device 104 is a device configured to support short-range wireless communications and, for example, may be a printer, a keyboard, a mouse, a wearable terminal (e.g., a head-mounted display, a headset), or the like.

Short-range wireless communication is wireless communication of a communication distance of about several tens of meters. An example of short-range wireless communication is communication using a wireless personal area network (PAN) such as, for example, Bluetooth, ZigBee (registered trademark), or the like.

Here, a pairing process is a process for performing pairing of devices to be connected. Pairing information generated by a device pairing process includes information for one device of the paired devices to recognize the other device. For example, pairing information includes the addresses of both paired devices and an encryption key used in data communication between the devices.

Among pairing operation methods is, for example, a method of establishing a connection between devices by the pressing of a physical key provided on a device. Further, there is a method of displaying a passcode on a device equipped with a display and recognizing a connection counterpart by an input of the passcode at the other device. Further, there is a method of using NFC whereby devices are recognized when brought into proximity of each other.

With such methods, once devices have been paired, the devices share a common key of a past pairing and at the second and subsequent connections, may use the shared encryption key to perform encrypted communication and thereby, by-pass the pairing operation to establish a connection without performing the pairing operation.

Pairing in this manner is effective in terms of security with respect to consumer use where numerous and unspecified devices are present. On the other hand, in business-use standardized to a certain extent, the pairing operation itself becomes a troublesome task, leading to decreases in work efficiency.

For example, a case is assumed in which a printer installed in an office is used from a smartphone possessed by an employee. In this case, the pairing operation is common among all of the employees. Therefore, work efficiency is improved more, for example, if the pairing operation is not performed by all of the employees using the printer and a manager or the like performs the pairing operation once to enable the other employees to use the printer without performing the pairing operation.

Further, there is a problem with the pairing operation itself. For example, since the method of pairing differs according to device, without a manual, a user may not know how to perform pairing for a device to be connected. Although there are devices that may be used without a pairing operation, the communicated contents of such devices is not encrypted and therefore, there is a concern in terms of security since a third party may intercept the communication.

Thus, in the present embodiment, a pairing management method enabling use of the peripheral device 104 without the user performing a bothersome pairing operation will be described. Hereinafter, an example of a process of the pairing management method according to the first embodiment will be described.

Here, a case is assumed in which the peripheral device 104 installed in an office is to be used from the user terminal 103 possessed by an employee. In this case, prior to use by the employee, a manager uses the management terminal 102 and performs a pairing operation with the peripheral device 104.

(1) The management terminal 102 detects a peripheral device capable of performing short-range wireless communication with the management terminal 102. In the example depicted in FIG. 1, the peripheral device 104 capable of short-range wireless communication with the management terminal 102 is assumed to be detected.

(2) The management terminal 102 executes a pairing process with the detected peripheral device 104. Below, (2a) to (2f) are one example of a detailed process procedure of the pairing process between the management terminal 102 and the peripheral device 104.

(2a) The management terminal 102 transmits a connection request to the detected peripheral device 104.

(2b) The peripheral device 104, when receiving the connection request, transmits a pairing requirement to the management terminal 102 as a connection response for the received connection request. A pairing requirement indicates a level of the pairing requested by the peripheral device 104. For example, a pairing requirement is information displayable as a passcode on an equipped display or information that may be input through an equipped keyboard.

(2c) The management terminal 102, when receiving the pairing requirement, selects a pairing method (or, whether pairing is possible) according to the received pairing requirement. The management terminal 102 transmits to the peripheral device 104, a pairing request (e.g., passcode entry) that includes a selection result of the selection.

(2d) The peripheral device 104, when receiving the pairing request, transmits to the management terminal 102, a pairing response (e.g., including a passcode) corresponding to the received pairing request. Here, as a pairing method, a case is assumed in which the manager inputs a passcode indicated on a seal affixed to the peripheral device 104 itself.

(2e) The management terminal 102, when receiving input of the passcode, exchanges a session key with the peripheral device 104 if the passcode included in the pairing response matches. The session key is a session key valid for the current session between the management terminal 102 and the peripheral device 104.

(2f) The peripheral device 104 generates an encryption key to be shared with the management terminal 102 and stores the generated encryption key associated with an address of the management terminal 102. The address of the management terminal 102 is an identifier identifying the management terminal 102 and, for example, is the Media Access Control (MAC) address of the management terminal 102. The peripheral device 104 uses the session key and transmits the generated encryption key to the management terminal 102.

Here, although the peripheral device 104 is assumed to generate the encryption key shared with the management terminal 102, configuration is not limited hereto. For example, the management terminal 102 may generate an encryption key shared with the peripheral device 104 and transmit the generated encryption key to the peripheral device 104.

(3) The management terminal 102 transmits to the management server 101, the pairing information generated by the pairing process with the peripheral device 104. The pairing information, for example, includes the address of the management terminal 102, an address of the peripheral device 104, and the generated encryption key. The address of the peripheral device 104 is an identifier identifying the peripheral device 104 and, for example, is the MAC address of the peripheral device 104.

Thereafter, the management terminal 102 may use the generated encryption key and perform data communication with the peripheral device 104. In particular, for example, the management terminal 102 uses the generated encryption key to encrypt data and transmits the data to the peripheral device 104. The peripheral device 104, when receiving the encrypted data from the management terminal 102, uses the encryption key shared with the management terminal 102 to decode the data.

(4) The management server 101, when receiving the pairing information from the management terminal 102, stores the received pairing information. Hereinafter, a case is assumed in which an employee (user) uses the peripheral device 104 from the user terminal 103.

(5) The user terminal 103 detects a peripheral device capable of performing short-range wireless communication with the user terminal 103. In the example depicted in FIG. 2, the peripheral device 104 capable of performing short-range wireless communication with the user terminal 103 is detected.

(6) The user terminal 103 transmits an acquisition request for pairing information of the detected peripheral device 104 to the management server 101. The acquisition request for the pairing information, for example, includes the address of the detected peripheral device 104.

(7) The management server 101, when receiving the acquisition request for the pairing information, transmits to the user terminal 103, the pairing information associated with the address of the peripheral device 104 included in the received acquisition request.

(8) The user terminal 103, when receiving the pairing information corresponding to the transmitted acquisition request, stores the received pairing information in the user terminal 103.

(9) The user terminal 103 transmits a connection request to the detected peripheral device 104.

(10) The peripheral device 104, when receiving the connection request, transmits to the user terminal 103, a pairing requirement as a connection response for the received connection request.

(11) The user terminal 103, when receiving the pairing requirement, performs data communication with the detected peripheral device 104 on the basis of the pairing information received from the management server 101. In particular, for example, the user terminal 103 sets the address of the management terminal 102 included in the received pairing information as the transmission source address of a communication packet (data) and uses the encryption key included in the received pairing information to encrypt the communication packet and transmits the communication packet to the peripheral device 104.

As a result, the user terminal 103 is allowed to communicate with the peripheral device 104 under the guise of the management terminal 102 already paired with the peripheral device 104. Further, since the peripheral device 104 is assumed to receive communication packets encrypted by a proper encryption key from a paired and recognized terminal apparatus, the peripheral device 104 may correctly decode communication packets by a possessed encryption key.

Thus, according to the pairing management method according to the first embodiment, once the manager performs the pairing operation, thereafter, a user may use the peripheral device 104 without performing a bothersome pairing operation. As a result, in business-use standardized to a certain extent, a troublesome pairing operation by a user may be omitted, enabling decreases in work efficiency to be prevented.

Further, in a general pairing operation, as described at (2c) above, the user terminal 103 selects a pairing method (or, whether pairing is possible) according to the pairing requirement. In contrast, in the present pairing management method, since the user terminal 103 may obtain information concerning pairing established once by a proper procedure between the management terminal 102 and the peripheral device 104, the user terminal 103 may disregard the pairing requirement and proceed with processing. Therefore, in the present pairing management method, even when the user terminal 103 does not satisfy the pairing requirement, the user terminal 103 may establish pairing with the peripheral device 104.

A system configuration example of a pairing management system 300 according to an embodiment will be described.

Figure 3:
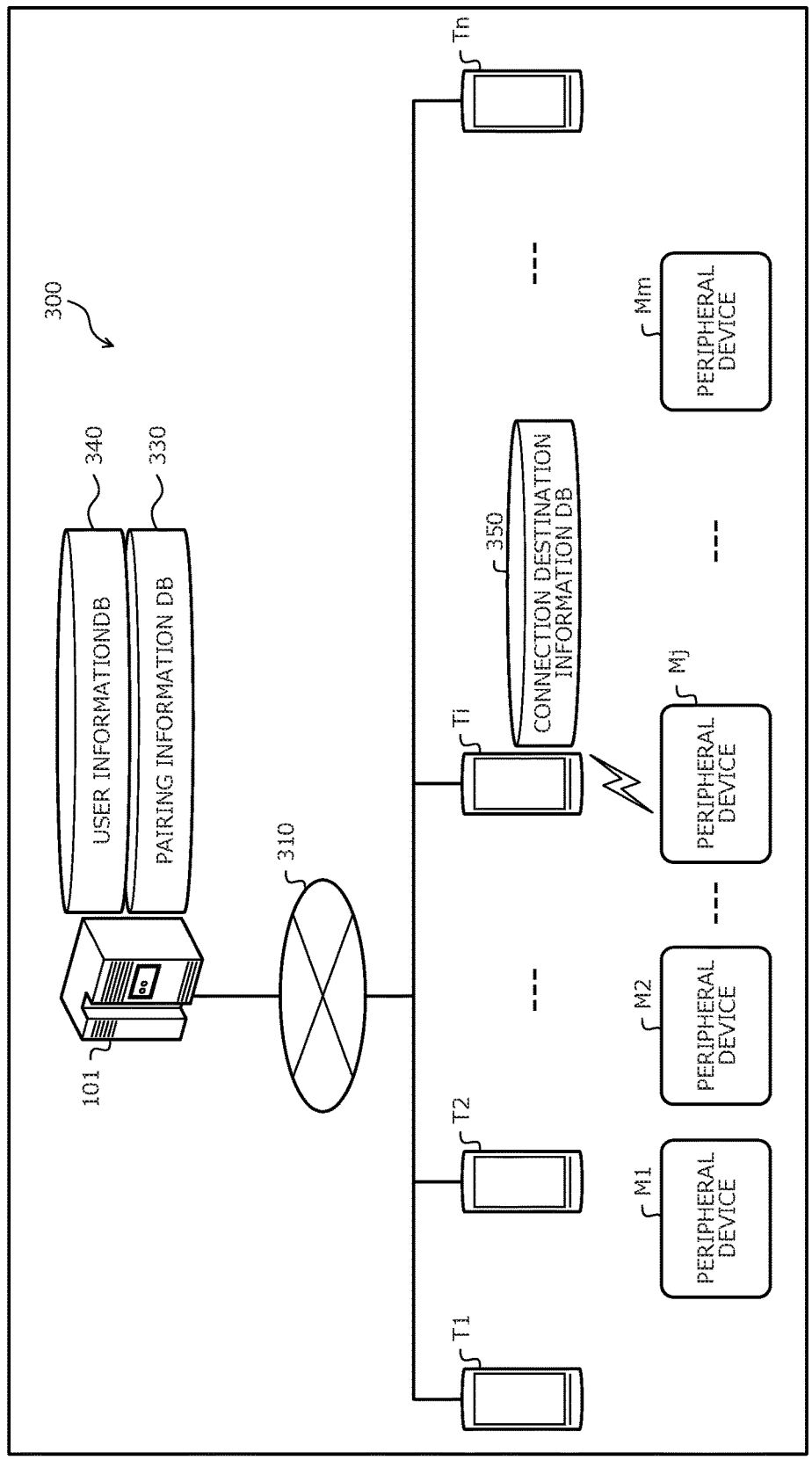
FIG. 3 is a diagram depicting a system configuration example of a pairing management system 300 according to the first embodiment.

FIG. 3 is a diagram depicting a system configuration example of the pairing management system 300 according to the first embodiment. In FIG. 3, the pairing management system 300 includes the management server 101, terminal apparatuses T1 to Tn, and peripheral devices M1 to Mm. In the pairing management system 300, the management server 101 and the terminal apparatuses T1 to Tn are connected through a wired or wireless network 310. The network 310, for example, is a mobile communications network, a LAN, a wide area network (WAN), the Internet, etc.

In the description below, an arbitrary terminal apparatus among the terminal apparatuses T1 to Tn may be indicated as "terminal apparatus Ti", where (i=1, 2, . . . , n). Further, an arbitrary peripheral device among the peripheral devices M1 to Mm may be indicated as "peripheral device Mj", where (j=1, 2, . . . , m).

Here, the management server 101 has a pairing information database (DB) 330 and a user information DB 340, and centrally manages pairing information generated by pairing processes between a terminal apparatus Ti and a peripheral device Mj. Storage contents of the pairing information DB 330 and the user information DB 340 will be described hereinafter using FIGS. 6 and 7.

A terminal apparatus Ti has a connection destination information DB 350 and is a computer capable of performing short-range wireless communication with a peripheral device Mj present within a short-range wireless communication range. The terminal apparatus Ti, for example, is a management terminal (e.g., the management terminal 102 depicted in FIG. 1) used by a manager of the peripheral device Mj, or operates as a user terminal (e.g., the user terminal 103 depicted in FIG. 1) used by a user of the peripheral device Mj. Storage contents of the connection destination information DB 350 will be described hereinafter using FIG. 8.

A peripheral device Mj is a device capable of performing short-range wireless communication with a terminal apparatus Ti present within a short-range wireless communication range. For example, the peripheral device Mj corresponds to the peripheral device 104 depicted in FIG. 1. In the present embodiment, although a case in which the management server 101 is in a separate housing from the terminal apparatus Ti is described as an example, configuration is not limited hereto. For example, the management server 101 may be provided in the housing of the management terminal. Further, for the sake of convenience in describing the management terminal and the user terminal, a case of separate housing will be described as an example, however, configuration is not limited hereto. For example, the management terminal and the user terminal may be the same terminal.

A hardware configuration example of the management server 101 depicted in FIG. 3 will be described.

Figure 4:
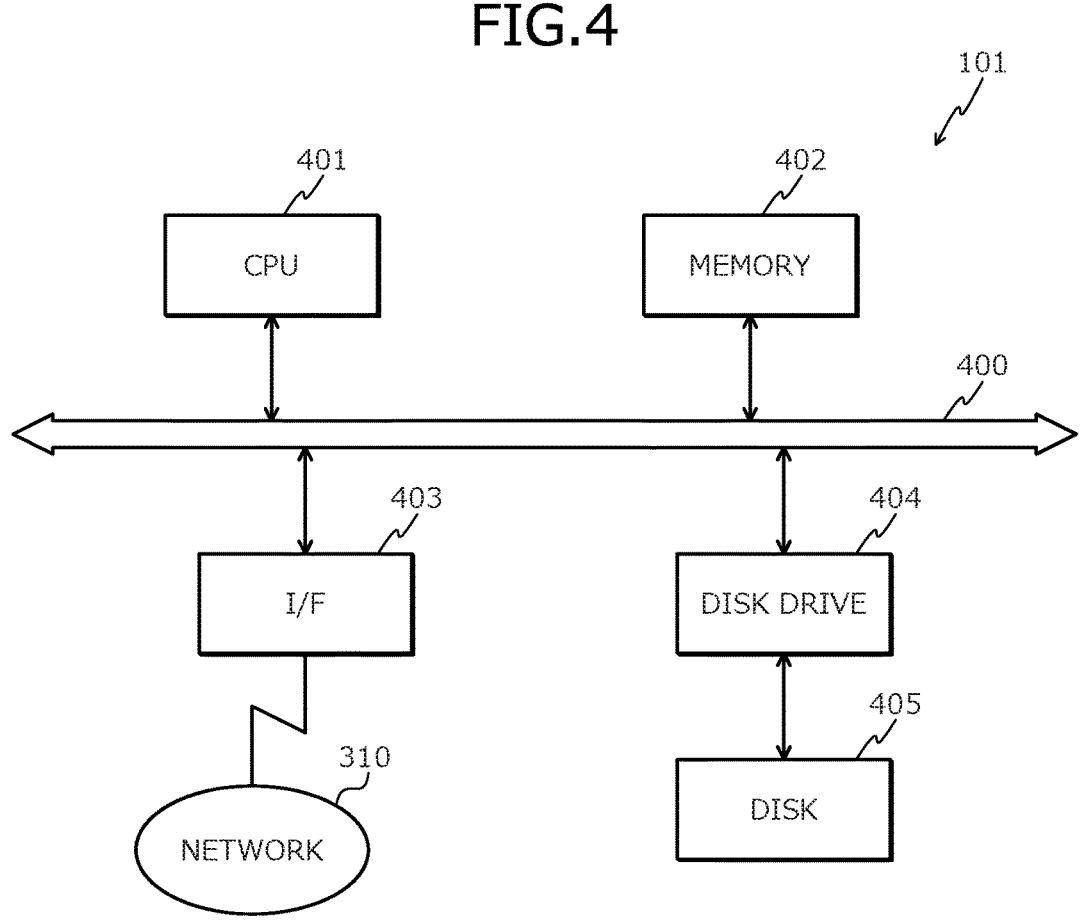
FIG. 4 is a block diagram depicting a hardware configuration example of a management server 101.

FIG. 4 is a block diagram depicting a hardware configuration example of the management server 101. In FIG. 4, the management server 101 has a central processing unit (CPU) 401, a memory 402, an interface (I/F) 403, a disk drive 404, and a disk 405, respectively connected by a bus 400.

Here, the CPU 401 governs overall control of the management server 101. The memory 402, for example, includes read-only memory (ROM), random access memory (RAM), flash ROM, and the like. In particular, for example, the flash ROM and the ROM store various types of programs; and the RAM is used as a work area of the CPU 401. The programs stored in the memory 402 are loaded onto to the CPU 401 whereby an encoded process is executed by the CPU 401.

The I/F 403 is connected to the network 310 via a communications line and is connected to other apparatuses (e.g., a terminal apparatus Ti depicted in FIG. 3) via the network 310. The I/F 403 administers an internal interface with the network 310 and controls the input and output of data from other apparatuses. A modem, LAN adapter, or the like may be employed as the I/F 403, for example.

The disk drive 404, under the control of the CPU 401, controls the reading and writing of data with respect to the disk 405. The disk 405 stores data written thereto under the control of the disk drive 404. For example, a magnetic disk, an optical disk, or the like may be given as an example of the disk 405.

The management server 101, other than the constituent parts above, for example, may have a solid state drive (SSD), a keyboard, a mouse, a display, and/or the like.

A hardware configuration example of the terminal apparatus Ti depicted in FIG. 3 will be described.

Figure 5:
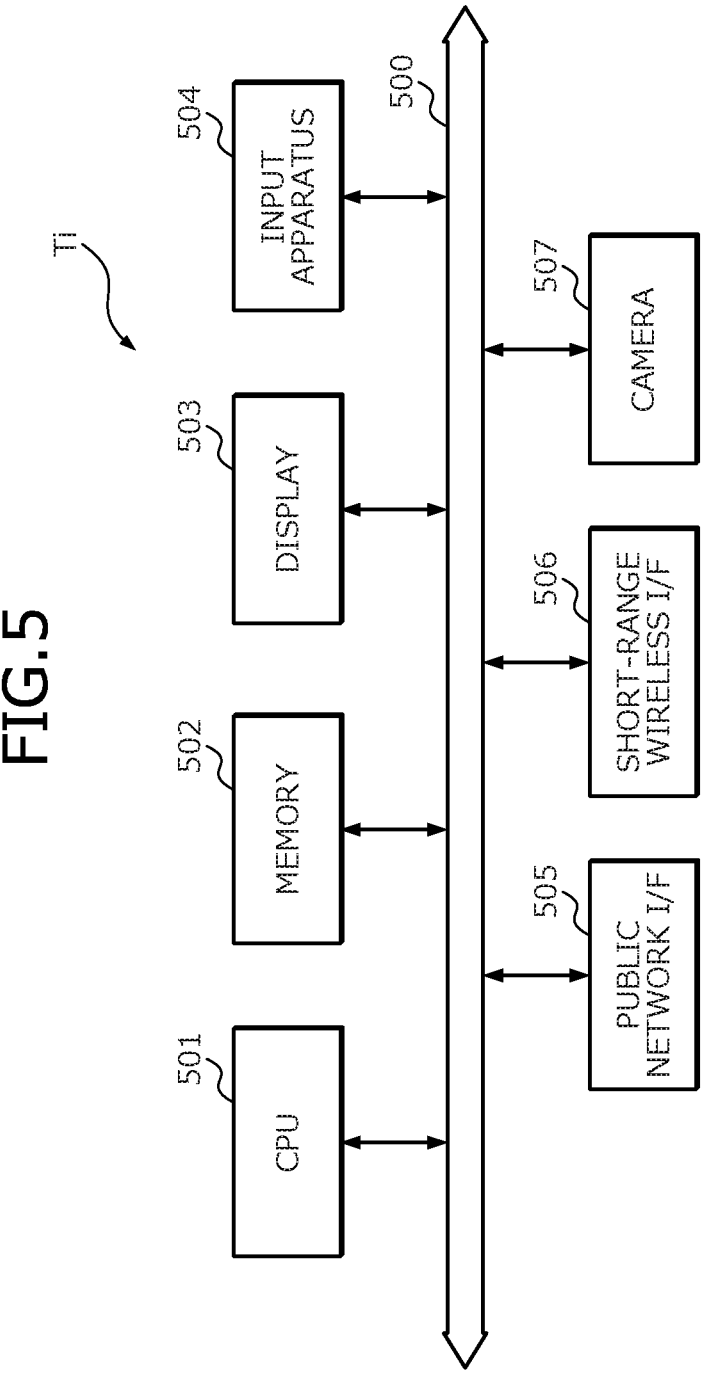
FIG. 5 is a block diagram depicting a hardware configuration example of a terminal apparatus Ti.

FIG. 5 is a block diagram depicting a hardware configuration example of the terminal apparatus Ti. In FIG. 5, the terminal apparatus Ti has a CPU 501, a memory 502, a display 503, an input apparatus 504, a public network I/F 505, a short-range wireless I/F 506, and a camera 507, respectively connected by a bus 500.

Here, the CPU 501 governs overall control of the terminal apparatus Ti. The memory 502 includes, for example, ROM, RAM, and flash ROM. In particular, for example, the flash ROM stores an OS program; the ROM stores an application program; and the RAM is used as a work area of the CPU 501. The programs stored in the memory 502 are loaded onto the CPU 501 whereby an encoded process is executed by the CPU 501.

The display 503 displays a curser, ions, toolboxes, and data such as documents, images and function information. The display 503, for example, may be a liquid crystal display, an organic electroluminescence (EL) display, or the like.

The input apparatus 504 has a key for inputting data such as text, numerals, various instructions, and the like. The input apparatus 504 may be a keyboard or a mouse, or a touch panel input pad, a numeric pad, or the like.

The public network I/F 505 is connected to the network 310 via a communications line and is connected to other apparatuses (e.g., the management server 101) via the network 310. The public network I/F 505 administers an internal interface with the network 310 and controls the input and output of data from other apparatuses.

The short-range wireless I/F 506 is connected to a short-range wireless network and is connected to other apparatuses (e.g., a peripheral device Mj) via the short-range wireless network. The short-range wireless I/F 506 administers an internal interface with the short-range wireless network and controls the input and output of data from other apparatuses. For example, a mobile communications modem, network communications chip, or the like may be employed as the public network I/F 505 and/or the short-range wireless I/F 506.

The camera 507 captures still images or moving pictures and outputs the images as image data. Images captured by the camera 507, for example, are stored to the memory 502 as image data. Further, the terminal apparatus Ti may have a function of reading Quick Response (QR) codes (registered trademark) or barcodes in a finder screen of the camera 507. The finder screen is a screen that displays the photograph subject and, for example, is displayed on the display 503.

The terminal apparatus Ti, other than the constituent parts described above, for example, may have a disk drive, a disk, a SSD, a global positioning system (GPS) unit, or the like. Further, the terminal apparatus Ti may have a voice recognition unit that A/D converts vocal sounds received by a microphone, a biometrics unit that recognizes biological information such as finger prints, veins, irises, and the like.

Storage contents of the pairing information DB 330 of the management server 101 according to the first embodiment will be described. The pairing information DB 330, for example, is realized by a storage apparatus such as the memory 402, the disk 405, etc. depicted in FIG. 4.

Figure 6:
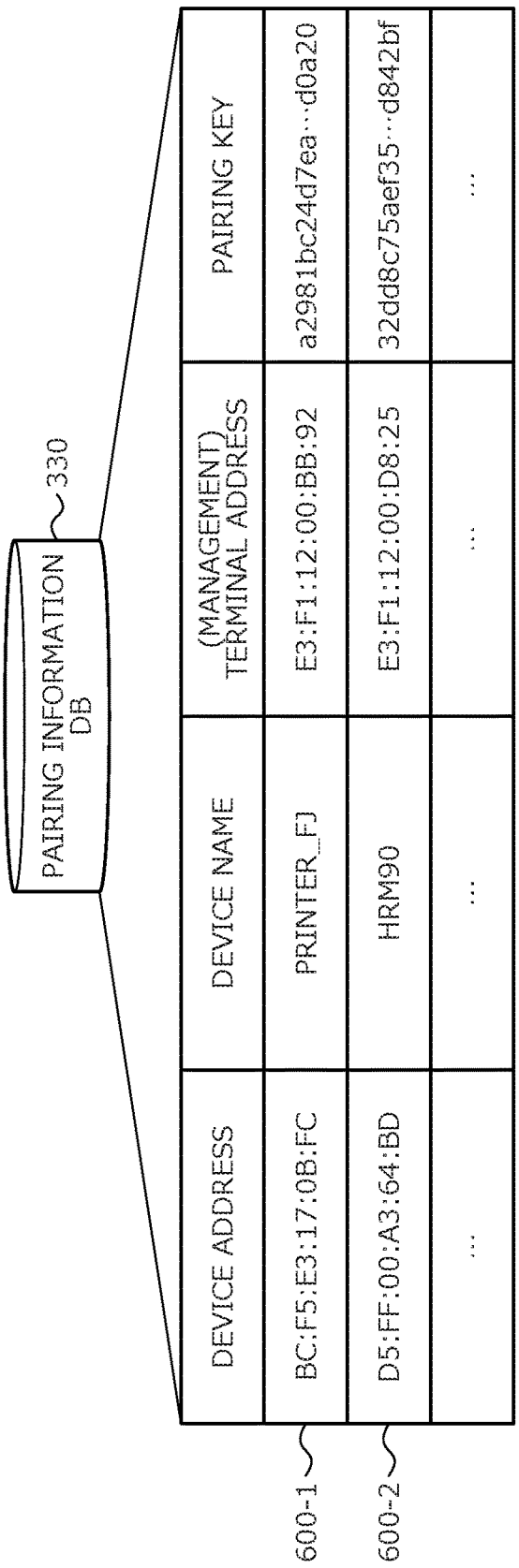
FIG. 6 is a diagram (part 1) of an example of storage contents of a pairing information DB 330.

FIG. 6 is a diagram (part 1) of an example of the storage contents of the pairing information DB 330. In FIG. 6, the pairing information DB 330 has fields for device addresses, device names, terminal addresses, and pairing keys. Information is set into each of the fields whereby pairing information (e.g., pairing information 600-1, 600-2) is stored as records.

Here, the device address is the address of a peripheral device Mj. The device name is the name of the peripheral device Mj. The terminal address is the address of a terminal apparatus Ti (management terminal) paired with the peripheral device Mj. The pairing key is an encryption key generated by a pairing process of the terminal apparatus Ti and the peripheral device Mj.

Storage contents of the user information DB 340 of the management server 101 according to the first embodiment will be described. The user information DB 340, for example, is realized by the memory 402, the disk 405, etc. depicted in FIG. 4.

Figure 7:
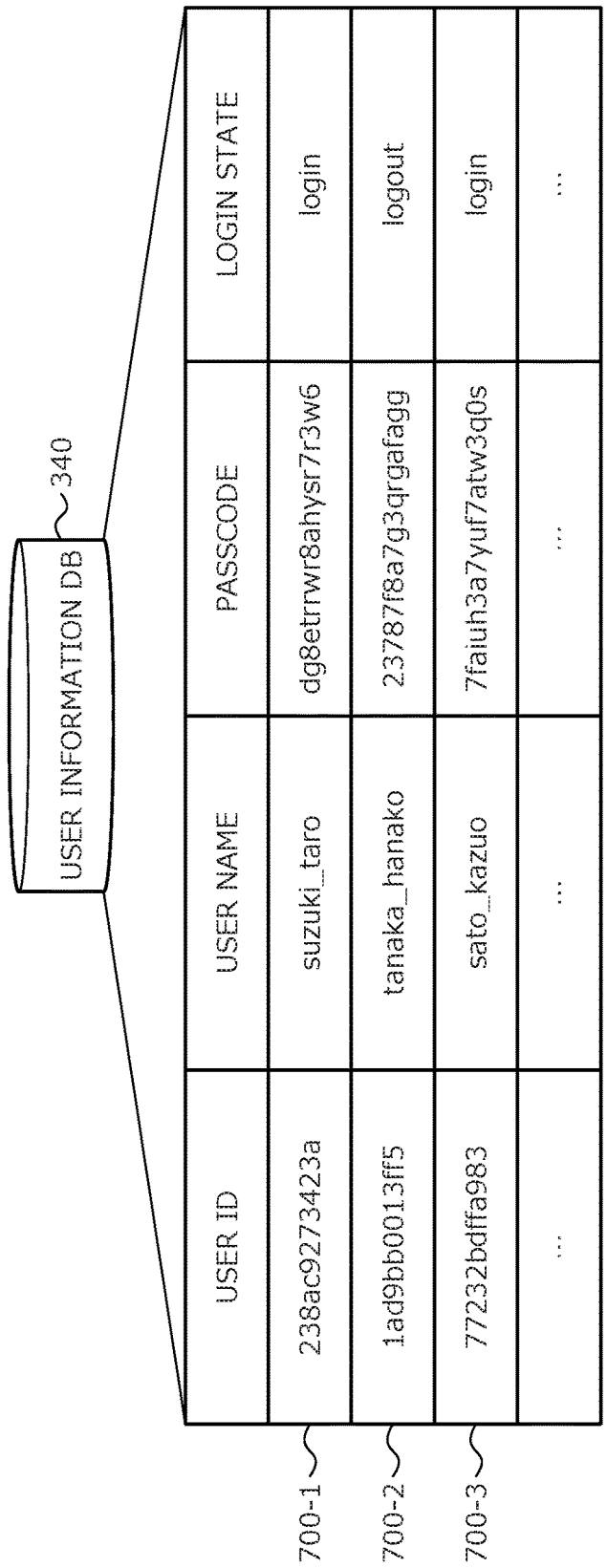
FIG. 7 is a diagram of an example of storage contents of a user information DB 340.

FIG. 7 is a diagram of an example of the storage contents of the user information DB 340. In FIG. 7, the user information DB 340 has fields for user IDs, user names, passcodes, and login states. Information is set into the fields whereby user information (e.g., user information 700-1 to 700-3) is stored as records.

Here, the user ID is an identifier of the user of a terminal apparatus Ti. The user name is the name of the user of the terminal apparatus Ti. The passcode is a password of the user of the terminal apparatus Ti and is stored in an encrypted state. The user name and the passcode, for example, are used at the time of user login.

The login state indicates whether the user of the terminal apparatus Ti is logged into the pairing management system 300 (refer to FIG. 3). Here, when the login state is "login", the user is logged in. Further, a login state of "logout" indicates that the user is not logged in.

Storage contents of the connection destination information DB 350 of a terminal apparatus according to the first embodiment will be described. The connection destination information DB 350, for example, is realized by the memory 502 depicted in FIG. 5.

Figure 8:
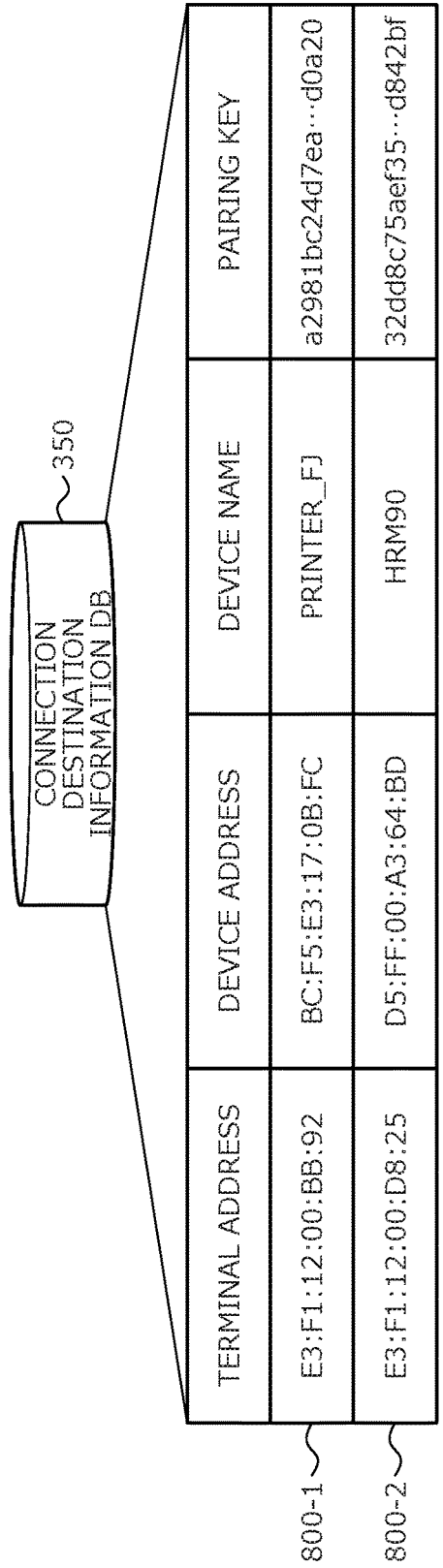
FIG. 8 is a diagram of an example of storage contents of a connection destination information DB 350.

FIG. 8 is a diagram of an example of the storage contents of the connection destination information DB 350. In FIG. 8, the connection destination information DB 350 has fields for terminal addresses, device addresses, device names, and pairing keys. Information is set into each of the fields whereby connection destination information (e.g., connection destination information 800-1, 800-2) is stored as records.

Here, the terminal address is the address of a terminal apparatus Ti (management terminal) already paired with the peripheral device Mj. The device address is the address of a peripheral device Mj paired with the terminal apparatus Ti (management terminal). The device name is the name of the peripheral device Mj. The pairing key is an encryption key generated by a pairing process of the terminal apparatus Ti (management terminal) and the peripheral device Mj.

Figure 9:
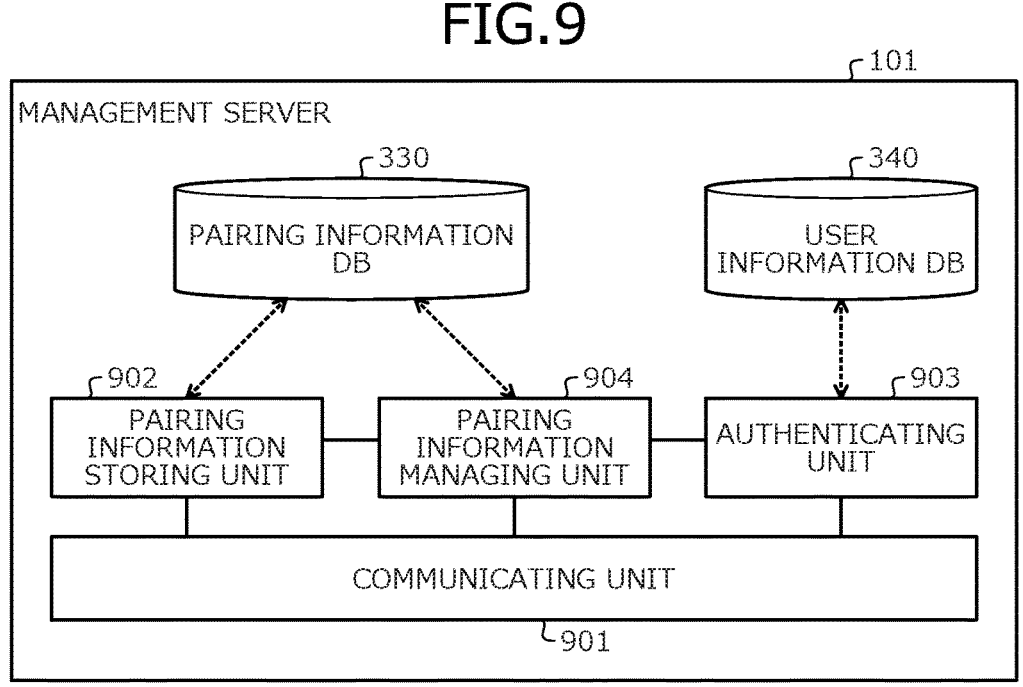
FIG. 9 is a block diagram depicting a functional configuration example of the management server 101.

FIG. 9 is a block diagram depicting a functional configuration example of the management server 101. In FIG. 9, the management server 101 has a configuration including a communicating unit 901, a pairing information storing unit 902, an authenticating unit 903, and a pairing information managing unit 904. The communicating unit 901 to the pairing information managing unit 904 are functions forming a control unit and in particular, for example, are realized by executing a program stored in a storage apparatus, such as the memory 402, the disk 405, etc. depicted in FIG. 4, on the CPU 401, or by the I/F 403. Process results of the functional units are, for example, stored to a storage apparatus such as the memory 402, the disk 405, or the like.

In the description hereinafter, a terminal apparatus Ti used by the manager of a peripheral device Mj may be indicated as "management terminal Ti", and a terminal apparatus Ti used by a user of the peripheral device Mj may be indicated as "user terminal Ti".

The communicating unit 901 receives from the management terminal Ti, pairing information generated by a pairing process of the management terminal Ti and the peripheral device Mj. Here, the pairing information, for example, includes the device address and the device name of the paired peripheral device Mj, the terminal address of the management terminal Ti, and a pairing key.

The pairing information storing unit 902 stores the pairing information received by the communicating unit 901. In particular, for example, the pairing information storing unit 902 stores the pairing information received from the management terminal Ti to the pairing information DB 330 depicted in FIG. 6.

Further, the communicating unit 901 receives from the user terminal Ti, an acquisition request for pairing information of the peripheral device Mj. Here, the acquisition request for the pairing information includes an identifier identifying the peripheral device Mj, for example, the device address and/or the device name of the peripheral device Mj.

The communicating unit 901 may transmit an authentication request to the user terminal Ti in response to the acquisition request for the pairing information received from the user terminal Ti. Here, the authentication request requests authentication of whether the user of the user terminal Ti is a proper user of the peripheral device Mj.

In this case, the communicating unit 901 receives authentication information from the user terminal Ti. Here, the authentication information, for example, includes the user name, a passcode, etc. input into a login screen of the user terminal Ti. The communicating unit 901, when receiving the authentication information from the user terminal Ti, notifies the authenticating unit 903 of the received authentication information.

The authenticating unit 903 authenticates the user of the user terminal Ti, based on the authentication information from the communicating unit 901. In particular, for example, the authenticating unit 903 decodes the notified authentication information and from the user information DB 340 (e.g., refer to FIG. 7), identifies the passcode associated with the user name included in the authentication information. The authenticating unit 903 compares the identified passcode and the passcode included in the authentication information.

When the passcodes match, the authenticating unit 903 authenticates the user of the user terminal Ti (authentication OK). On the other hand, when the passcodes do not match, the authenticating unit 903 does not authenticate the user of the user terminal Ti (authentication NG). Further, from the user information DB 340, the authenticating unit 903 may not identify a passcode associated with the user name included in the authentication information. In this case, the authenticating unit 903 does not authenticate the user of the user terminal Ti (authentication NG).

The pairing information managing unit 904 extracts from the pairing information DB 330, the pairing information associated with the acquisition request received by the communicating unit 901. In particular, for example, when the user of the user terminal Ti is authenticated by the authenticating unit 903, the pairing information managing unit 904 extracts from the pairing information DB 330, the pairing information associated with the acquisition request. More specifically, the pairing information managing unit 904 extracts from the pairing information DB 330, the pairing information associated with the device address (or, the paired device address and device name) included in the acquisition request.

The communicating unit 901 transmits the pairing information extracted by the pairing information managing unit 904 to the user terminal Ti. At this time, the communicating unit 901 may record to the pairing information DB 330, utilization state information of the user terminal Ti that is the transmission destination of the pairing information. The utilization state information, for example, is information indicating that the user terminal Ti is using (is paired with) the peripheral device Mj.

As a result, the utilization state of the peripheral device Mj by the user terminal Ti (e.g., pairing) may be managed. Further, when no pairing information is extracted by the pairing information managing unit 904, the communicating unit 901 may transmit to the user terminal Ti, a message indicating that no pairing information exists.

The communicating unit 901 further receives a key update request from the user terminal Ti. Here, the key update request, for example, includes the device address of the paired peripheral device Mj, the device name, the terminal address of the management terminal Ti, and the updated pairing key.

When the key update request is received by the communicating unit 901, the pairing information storing unit 902 updates the pairing information associated with the key update request. In particular, for example, the pairing information storing unit 902 identifies from the pairing information DB 330, the pairing key associated with the combination of the terminal address of the management terminal Ti, the device name, and the device address of the peripheral device Mj included in the key update request. The pairing information storing unit 902 updates the identified pairing key to the updated pairing key included in the key update request.

In the description above, the management server 101 transmits an authentication request to the user terminal Ti in response to receiving an acquisition request for pairing information and receives authentication information from the user terminal Ti, however, configuration is not limited hereto. For example, the authentication information may be included in the acquisition request for the pairing information from the user terminal Ti. In this case, the authenticating unit 903 authenticates the user of the user terminal Ti based on the authentication information included in the acquisition request for pairing information.

Further, in the description above, the authenticating unit 903 uses the user name, passcode, etc. input into a login screen of the user terminal Ti to authenticate the user of the user terminal Ti, however, configuration is not limited hereto. For example, the authenticating unit 903 may authenticate the user of the user terminal Ti by voice authentication using voice information recognized at the user terminal Ti. Further, the authenticating unit 903, for example, may authenticate the user of the user terminal Ti by biometric authentication using biological information such as a finger print, vein, or iris recognized at the user terminal Ti. The authenticating unit 903, for example, may authenticate the user of the user terminal Ti based on information unique to the user terminal Ti. Information unique to the user terminal Ti, for example, is terminal certificate information embedded in a security chip inside the user terminal Ti.

Figure 10:
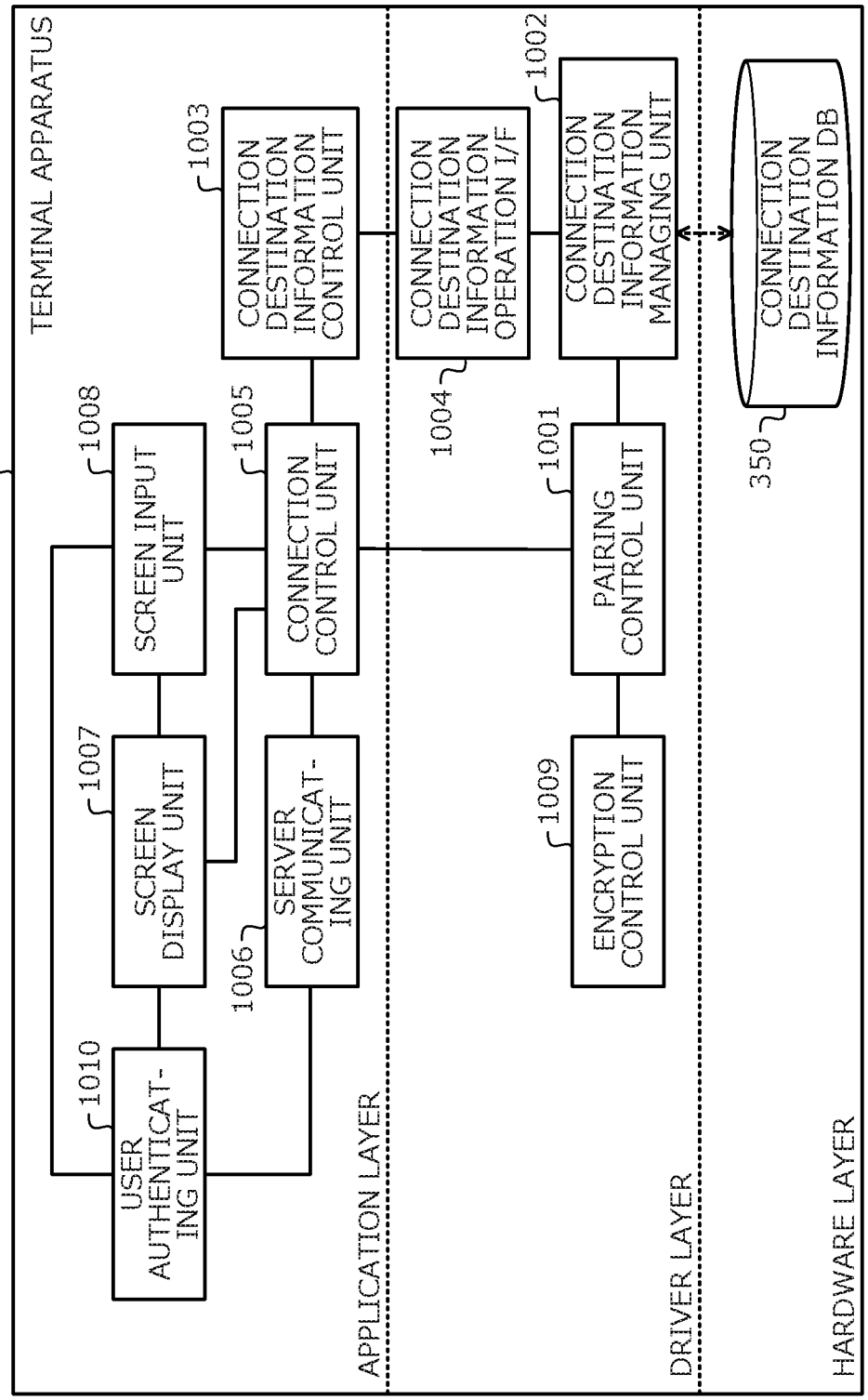
FIG. 10 is a block diagram depicting a functional configuration example of the terminal apparatus Ti.

FIG. 10 is a block diagram depicting a functional configuration example of the terminal apparatus Ti. In FIG. 10, the terminal apparatus Ti has a configuration including a pairing control unit 1001, a connection destination information managing unit 1002, a connection destination information control unit 1003, a connection destination information operation I/F 1004, a connection control unit 1005, a server communicating unit 1006, a screen display unit 1007, a screen input unit 1008, an encryption control unit 1009, and a user authenticating unit 1010.

The pairing control unit 1001 to the user authenticating unit 1010 are functions forming a control unit and in particular, for example, are realized by executing on the CPU 501, a program stored in the memory 502 depicted in FIG. 5, or by the public network I/F 505 or the short-range wireless I/F 506. Process results of the functional units, for example, are stored to the memory 502. Further, the pairing control unit 1001, the connection destination information managing unit 1002, the connection destination information operation I/F 1004, and the encryption control unit 1009 are driver layer functional units. The connection destination information control unit 1003, the connection control unit 1005, the server communicating unit 1006, the screen display unit 1007, the screen input unit 1008, and the user authenticating unit 1010 are application layer functional units.

As described above, the terminal apparatus Ti may operate as the "management terminal Ti" or the "user terminal Ti". Here, first, functions of the functional units in a case in which the terminal apparatus Ti functions as the "management terminal Ti" will be described.

The pairing control unit 1001 controls the pairing process of the terminal apparatus Ti and a peripheral device Mj. In particular, for example, the pairing control unit 1001 detects a peripheral device Mj present within a short-range wireless communication range by the short-range wireless I/F 506. The pairing control unit 1001 executes a pairing process with the detected peripheral device Mj.

The connection destination information managing unit 1002 stores a pairing key generated by a pairing process of the terminal apparatus Ti and the peripheral device Mj. In particular, for example, the connection destination information managing unit 1002 associates the pairing key generated by the pairing process with the terminal address of the terminal apparatus Ti and the device address and the device name of the peripheral device Mj, and stores the pairing key to the connection destination information DB 350 depicted in FIG. 8. As a result, new connection destination information is stored to the connection destination information DB 350 as a record.

The connection destination information control unit 1003, when the pairing process of the terminal apparatus Ti and the peripheral device Mj is completed, acquires connection destination information from the connection destination information managing unit 1002 via the connection destination information operation I/F 1004. The connection destination information operation I/F 1004 is an I/F for accessing connection destination information from a higher application. Further, the connection destination information control unit 1003 notifies the connection control unit 1005 of the connection destination information acquired from the connection destination information managing unit 1002.

The connection control unit 1005 transmits to the management server 101 via the server communicating unit 1006, the connection destination information from the connection destination information control unit 1003. The server communicating unit 1006 controls communication with the management server 101. In particular, for example, the server communicating unit 1006, under the instruction of the connection control unit 1005, transmits connection destination information to the management server 101 by the public network I/F 505. The address of the management server 101, for example, is stored in the memory 502. Further, the connection destination information, for example, includes the terminal address of the terminal apparatus Ti, the device address and the device name of the peripheral device Mj, and the pairing key.

The connection control unit 1005, before requesting the server communicating unit 1006 for transmission of connection destination information, may request the screen display unit 1007 to display, for example, indication of "transmit connection destination information to server". In this case, the screen display unit 1007, for example, displays on the display 503 (refer to FIG. 5), a confirmation screen (not depicted) confirming whether the connection destination information is to be transmitted to the management server 101.

Further, the screen input unit 1008, for example, when sensing operation input of a pressing of a confirmation button, etc. on the confirmation screen displayed on the display 503, notifies the connection control unit 1005 of permission for information transmission to the management server 101. In this case, the connection control unit 1005 holds information transmission to the management server 101 and when receiving permission for information transmission from the screen input unit 1008, requests the server communicating unit 1006 for transmission of the connection destination information.

As a result, the user may confirm the transmission of information to the management server 101. Further, at the time of display of the confirmation screen, information indicating to which management server 101 information is to be transmitted and information indicating what type of connection destination information is to be transmitted may be displayed. Further, when multiple management servers 101 are present, selection options may be displayed on the confirmation screen to have the user select the management server 101 that is to be the transmission destination.

The encryption control unit 1009 performs a communication encryption process based on an instruction of the pairing control unit 1001. Further, the user authenticating unit 1010 authenticates the user of the management terminal Ti. In particular, for example, when the password input to a password input screen displayed on the display 503 and a preregistered password match, the user authenticating unit 1010 authenticates the user and releases a screen lock, etc. At the management terminal Ti, when user authentication is not necessary, the user authenticating unit 1010 may be omitted.

Functions of the functional units in a case in which the terminal apparatus Ti operates as a "user terminal Ti" will be described. However, functions identical to the functions of the management terminal Ti described above may be omitted.

The connection control unit 1005 detects a peripheral device Mj capable of short-range wireless communication with the user terminal Ti. In particular, for example, the connection control unit 1005 requests the short-range wireless I/F 506 for a peripheral device Mj scan. As a result, a device list of peripheral devices Mj present within a short-range wireless communication range of the user terminal Ti may be acquired.

The timing of the scanning request by the connection control unit 1005, for example, may be when the user unlocks and restores the user terminal Ti from a sleep state. However, if scanning occurs each time the user unlocks the user terminal Ti, information for a peripheral device Mj that the user has a low possibility of using may also be acquired.

Therefore, the connection control unit 1005, for example, may request a peripheral device Mj scan when an application is started up. Further, when an application is started up, the connection control unit 1005, for example, may narrow down the scan targets by examining, when a program is loaded, the peripheral devices Mj that may be used by the application.

Further, the connection control unit 1005 transmits to the management server 101 via the server communicating unit 1006, an acquisition request for the pairing information of a detected peripheral device Mj. In particular, for example, the connection control unit 1005 notifies the server communicating unit 1006 of the peripheral devices Mj listed in the device list. In this case, the server communicating unit 1006 transmits to the management server 101, an acquisition request for the pairing information of a peripheral device Mj notified by the connection control unit 1005. The acquisition request for the pairing information, for example, includes the device address and the device name of the peripheral device Mj.

Further, the server communicating unit 1006, when receiving the authentication request from the management server 101, notifies the user authenticating unit 1010 of the received authentication request. The user authenticating unit 1010, when receiving the authentication request, sends a display request for a login screen to the screen display unit 1007. The screen display unit 1007, when receiving the display request for a login screen, displays a login screen (e.g., a login screen 1102 depicted in FIG. 11 described hereinafter) on the display 503. As a result, a standby state of awaiting input of authentication information from the user begins.

The screen input unit 1008, when receiving input of authentication information in the login screen, notifies the user authenticating unit 1010 of the input authentication information. The authentication information, for example, is the user name, a passcode, etc. The user authenticating unit 1010, when receiving the authentication information, encodes the received authentication information and transmits the authentication information to the management server 101 via the server communicating unit 1006.

The encoding of the authentication information may be encryption using an encryption key, or encoding using a method by a series of safe exchanges such as that represented by a Challenge&Response method. Further, voice information of the user recognized by a voice recognizing unit (not depicted), or biological information such as a finger print, vein, iris, etc. of the user recognized by a biometric recognizing unit (not depicted) may be used as the authentication information. Further, information unique to the user terminal Ti may be used as the authentication information.

The server communicating unit 1006 receives from the management server 101, pairing information associated with the transmitted acquisition request. In particular, for example, when the user (or, the user terminal Ti) is authenticated based on the transmitted authentication information, the server communicating unit 1006 receives from the management server 101, the pairing information associated with the acquisition request. The pairing information, for example, includes the device address and the device name of the peripheral device Mj, the terminal address of the management terminal Ti, and the pairing key.

Further, the server communicating unit 1006, when receiving the pairing information associated with the acquisition request, notifies the connection destination information control unit 1003 of the received pairing information. The connection destination information control unit 1003, when receiving the pairing information, sends the pairing information to the connection destination information managing unit 1002 via the connection destination information operation I/F 1004.

The connection destination information managing unit 1002, when receiving the pairing information, stores the pairing information as connection destination information to the connection destination information DB 350. As a result, the user terminal Ti may acquire the pairing information of a peripheral device Mj that may be used.

The connection control unit 1005 performs data communication with the detected peripheral device Mj based on the received pairing information. In particular, for example, the connection control unit 1005 in response to an access request from an application, transmits a connection request to the detected peripheral device Mj via the pairing control unit 1001.

Further, via the pairing control unit 1001, the connection control unit 1005 receives from the peripheral device Mj, a connection response (pairing requirement) in response to the connection request. The connection control unit 1005, when receiving the connection response (pairing requirement) via the connection destination information control unit 1003, uses the device address of the peripheral device Mj as a key and searches the connection destination information DB 350 for connection destination information managed by the connection destination information managing unit 1002.

The connection control unit 1005 sets the terminal address included in retrieved connection destination information as the transmission source address of data (communication packet). The connection control unit 1005 further uses the pairing key included in the retrieved connection destination information to encrypt the data (communication packet). The connection control unit 1005 transmits the encrypted data to the peripheral device Mj, via the pairing control unit 1001.

As a result, the user terminal Ti may communicate with the peripheral device Mj under the guise of the management terminal Ti. Since the peripheral device Mj is assumed to receive communication packets encrypted by a proper encryption key (pairing key) from the paired terminal apparatus, the user terminal Ti may correctly decode the communication packets by a possessed encryption key.

Further, in response to the detection of a peripheral device Mj, the connection control unit 1005 may determine whether pairing information associated with the detected peripheral device Mj is stored in the connection destination information DB 350. In particular, for example, the connection control unit 1005 determines whether connection destination information associated with the device address of the detected peripheral device Mj is stored in the connection destination information DB 350.

As a result, before transmitting an acquisition request for pairing information to the management server 101, the connection control unit 1005 may determine whether pairing information for the peripheral device Mj has already been acquired from the management server 101.

Subsequently, when pairing information associated with the detected peripheral device Mj is not stored, the connection control unit 1005 may transmit the acquisition request for pairing information of the detected peripheral device Mj, to the management server 101 via the server communicating unit 1006.

On the other hand, when pairing information associated with the detected peripheral device Mj is stored, the connection control unit 1005 may perform data communication with the detected peripheral device Mj, based on the pairing information (connection destination information) stored in the connection destination information DB 350. As a result, the connection control unit 1005 may perform data communication with the peripheral device Mj, using pairing information already acquired from the management server 101.

Further, encryption keys (pairing keys) may be periodically updated depending on the peripheral device Mj. Therefore, when the encryption key of a peripheral device Mj is updated during data communication with the peripheral device Mj, the connection destination information control unit 1003 transmits to the management server 101 via the server communicating unit 1006, a key update request for the peripheral device Mj. The key update request includes the device address and the device name of the peripheral device Mj, the terminal address of the management terminal Ti, and the updated pairing key.

The connection control unit 1005, when sensing the termination of the application, may delete connection destination information in the connection destination information DB 350 via the connection destination information control unit 1003. In this case, the connection control unit 1005 may transmit to the management server 101 via the server communicating unit 1006, utilization termination notification concerning the peripheral device Mj. Further, the management server 101, when receiving the utilization termination notification from the user terminal Ti, may delete the utilization state information of the user terminal Ti.

However, the timing of the deletion of the connection destination information in the connection destination information DB 350 and the transmission of the utilization termination notification may be other than at the time of application termination. For example, the deletion and transmission may be performed when the user terminal Ti transitions to a sleep state, or may be performed after a certain period (e.g., a few hours) has elapsed since the reception of the pairing information from the management server 101. Further, the user terminal Ti, when receiving from the management server 101, a message indicating that pairing information is not present, may perform a general pairing operation with the peripheral device Mj.

Transition examples of various screens displayed on the display 503 of the user terminal Ti will be described. Here, transition examples of various screens from the start of scanning for a peripheral device Mj at the time of startup of an application until connection to the peripheral device Mj will be described. Further, description will be given taking a "printer" as an example of the peripheral device Mj.

Figure 11:
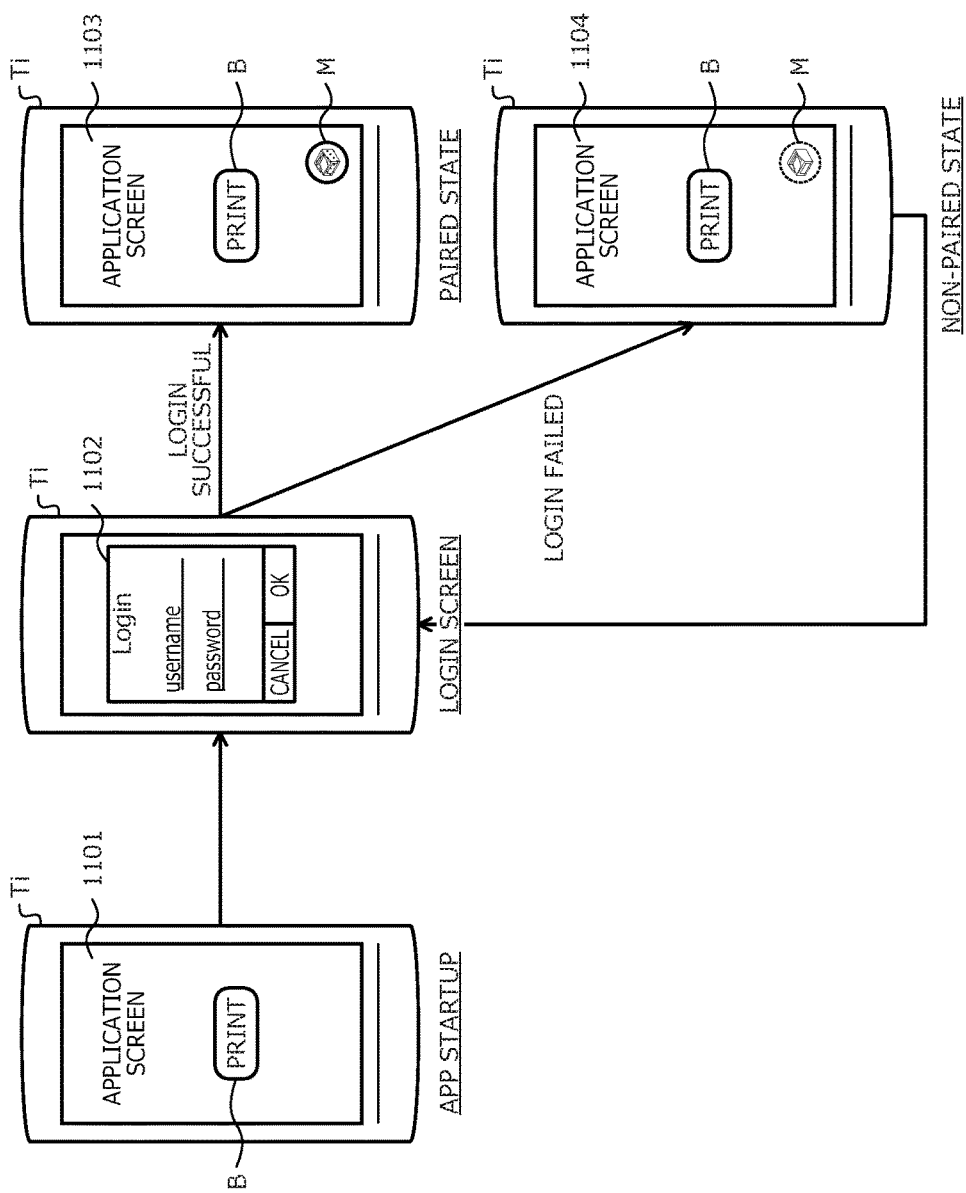
FIG. 11 is a diagram depicting a screen transition example of the user terminal Ti according to the first embodiment.

FIG. 11 is a diagram depicting a screen transition example of the user terminal Ti according to the first embodiment. In FIG. 11, an application screen 1101 is an example of a screen displayed on the display 503 at the time of startup of an application of the user terminal Ti.

Here, when a printer capable of performing short-range wireless communication with the user terminal Ti is detected, an acquisition request for pairing information of the printer is transmitted to the management server 101, and the login screen 1102 is displayed on the display 503. When a peripheral device Mj capable of performing short-range wireless communication with the user terminal Ti is not present, screen transition does not occur.

The login screen 1102 is an example of a screen for inputting authentication information of the user of the user terminal Ti. In the login screen 1102, when a user name (username) and passcode (password) are input by user-operation input, authentication information including the input user name and passcode is encoded and transmitted to the management server 101.

An application screen 1103 is an example of a screen displayed on the display 503 when login is successful (i.e., authentication OK) and pairing with the printer has been completed using pairing information acquired from the management server 101. In the application screen 1103, a device icon M representing the printer is displayed overlaid. The device icon M displayed overlaid indicates that the printer may be used.

From the application screen 1103, the user may recognize that the printer represented by the device icon M may be used. Further, in the application screen 1103, when a print button B is tapped, an access request from the application to the printer is issued, enabling printing to be executed.

Further, an application screen 1104 is an example of a screen displayed on the display 503 when login has failed (i.e., authentication NG). In the application screen 1104, the device icon M representing the printer is displayed grayed out (in FIG. 11, depicted encompassed by a dotted line). The device icon M grayed out indicates that the printer may not be used.

From the application screen 1104, the user may recognize that although a printer is in a vicinity of the user terminal Ti, the printer has not been paired and thus, is not in a useable state. Further, in the application screen 1104, when the device icon M is tapped, the displayed screen returns to the login screen 1102, enabling the authentication information of the user of the user terminal Ti to again be input.

A pairing information management process procedure of the management server 101 according to the first embodiment will be described.

Figure 12:
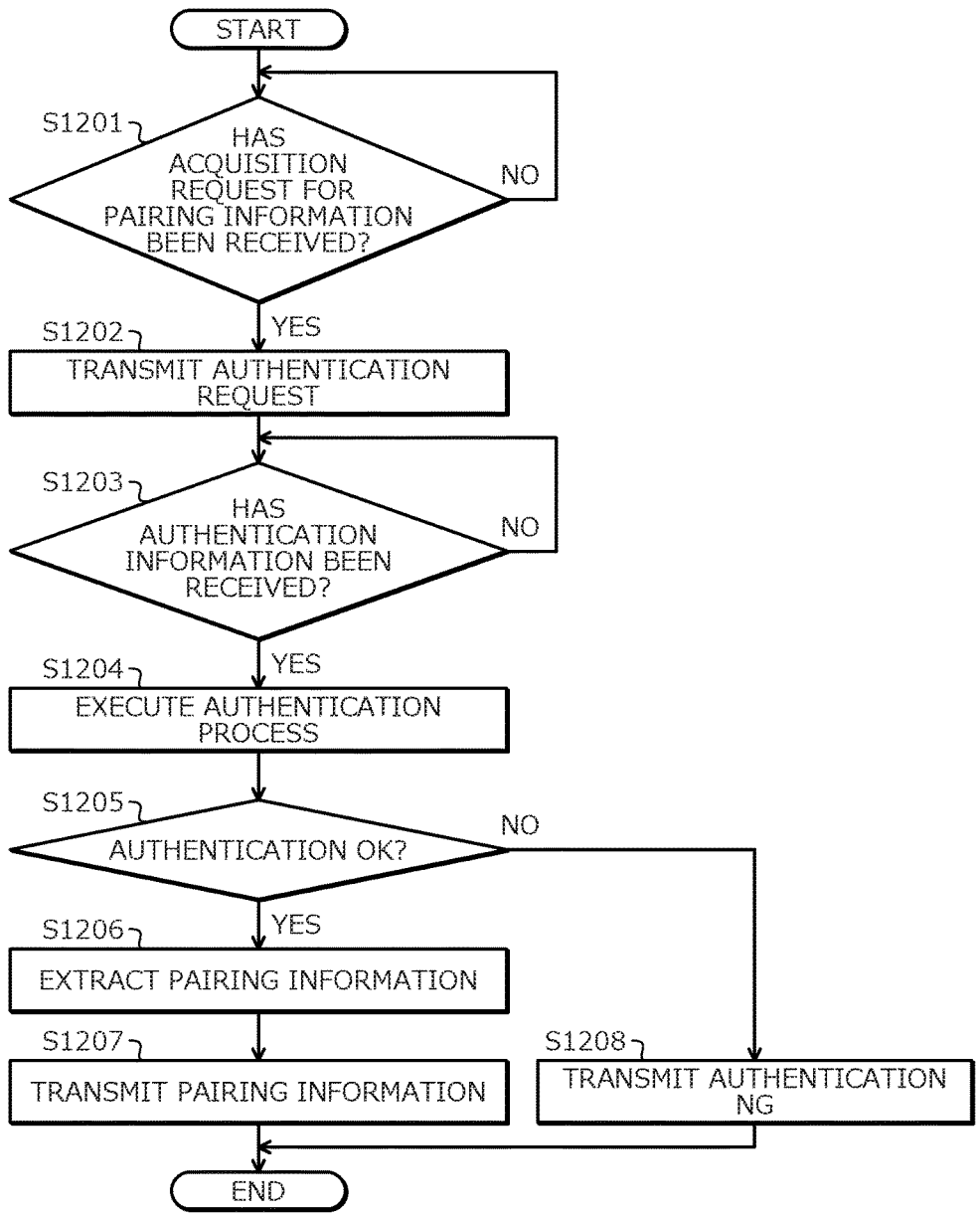
FIG. 12 is a flowchart of an example of a pairing information management process procedure of the management server 101 according to the first embodiment.

FIG. 12 is a flowchart of an example of the pairing information management process procedure of the management server 101 according to the first embodiment. In the flowchart depicted in FIG. 12, first, the management server 101 determines whether an acquisition request for pairing information of a peripheral device Mj has been received from a user terminal Ti (step S1201).

Here, the management server 101 stands by until receiving an acquisition request for pairing information (step S1201: NO). When receiving an acquisition request for pairing information (step S1201: YES), the management server 101 transmits an authentication request to the user terminal Ti (step S1202).

The management server 101 determines whether authentication information has been received from the user terminal Ti (step S1203). Here, the management server 101 stands by until receiving the authentication information (step S1203: NO). When receiving the authentication information (step S1203: YES), the management server 101 executes an authentication process with respect to the user of the user terminal Ti, based on the received authentication information (step S1204).

The management server 101 determines whether the user of the user terminal Ti has been authenticated (step S1205). If the user has been authenticated (step S1205: YES), the management server 101 extracts from the pairing information DB 330, pairing information associated with the received acquisition request (step S1206).

The management server 101 transmits the extracted pairing information to the user terminal Ti (step S1207), ending a series of operations according to the present flowchart. Further, at step S1205, if the user is not authenticated (step S1205: NO), the management server 101 transmits to the user terminal Ti, an authentication result indicating "authentication NG" (step S1208), ending a series of operations according to the present flowchart.

As a result, pairing information of the peripheral device Mj may be provided to a proper user of the peripheral device Mj.

The pairing management process procedure of the user terminal Ti according to the first embodiment will be described.

Figure 13:
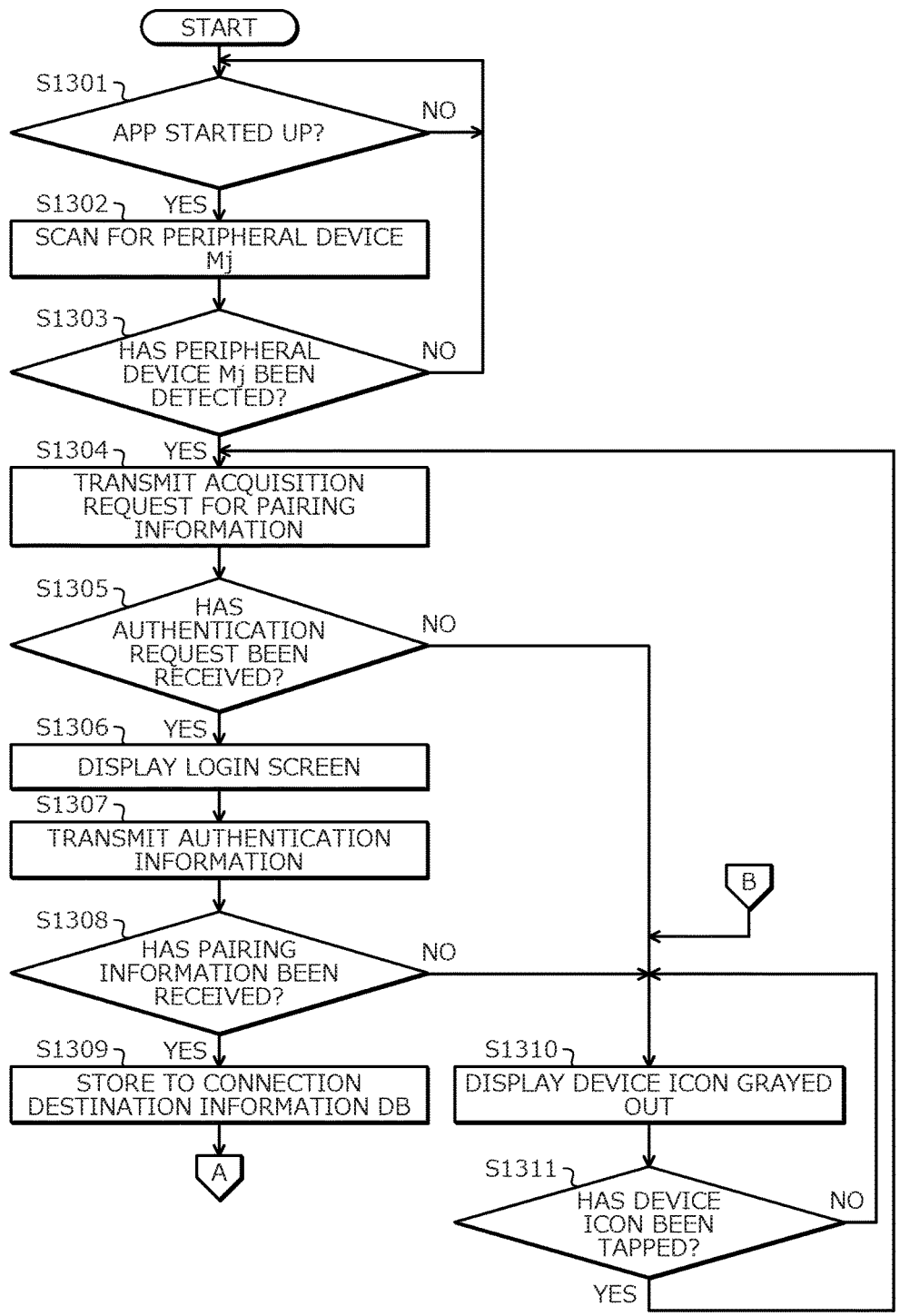
FIG. 13 is a flowchart (part 1) of an example of a pairing management process procedure of the user terminal Ti according to the first embodiment.
Figure 14:
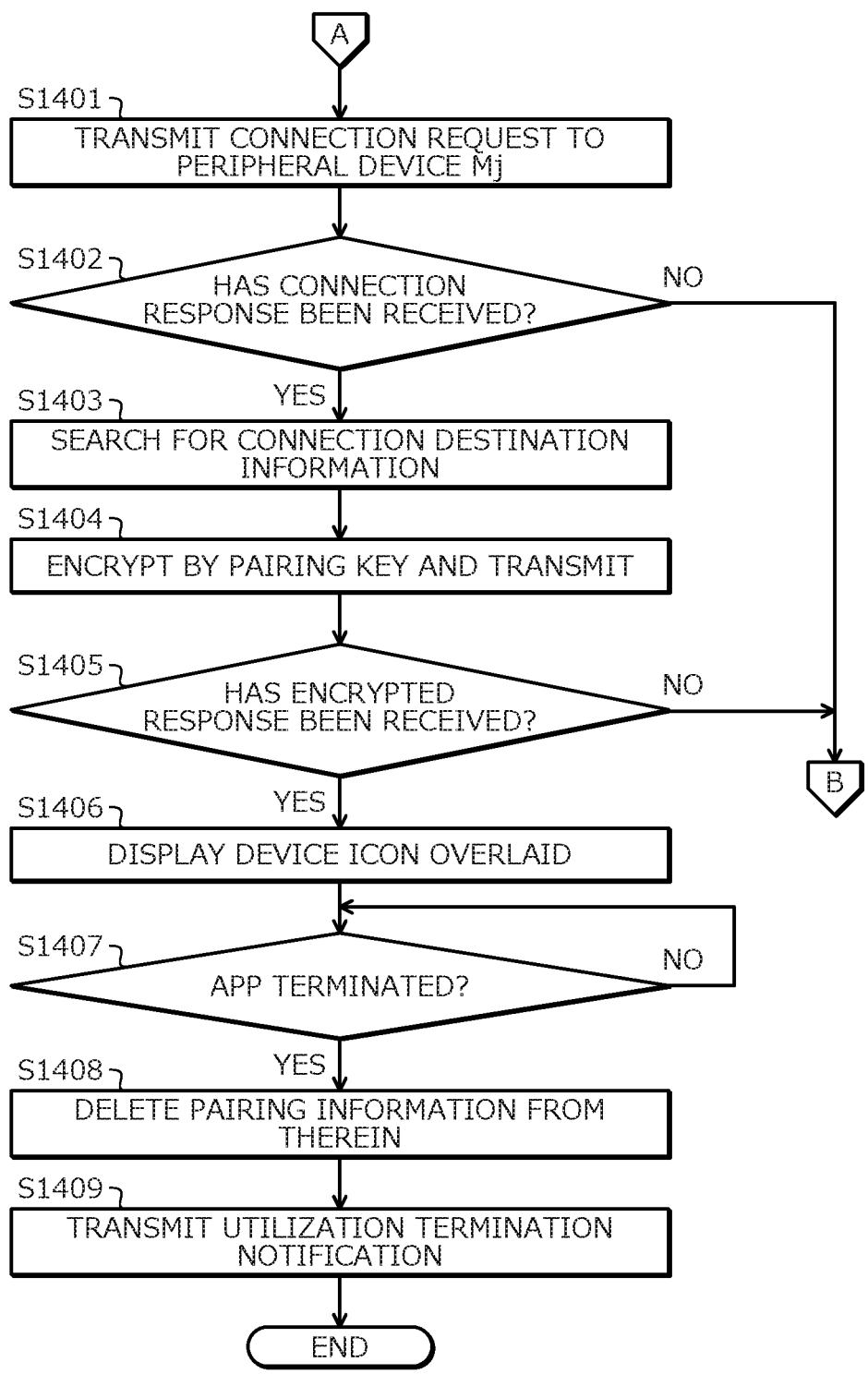
FIG. 14 is a flowchart (part 2) of the example of the pairing management process procedure of the user terminal Ti according to the first embodiment.

FIGS. 13 and 14 are flowcharts of an example of a pairing management process procedure of the user terminal Ti according to the first embodiment. In the flowchart depicted in FIG. 13, first, the user terminal Ti determines whether an application (in FIG. 13, denoted as "app") has been started up (step S1301). Here, the user terminal Ti stands by until an application is started up (step S1301: NO).

When an application has been started up (step S1301: YES), the user terminal Ti scans for a peripheral device Mj capable of performing short-range wireless communication with the user terminal Ti (step S1302). The user terminal Ti determines whether a peripheral device Mj has been detected (step S1303).

Here, if no peripheral device Mj has been detected (step S1303: NO), the user terminal Ti returns to step S1301. On the other hand, if a peripheral device Mj has been detected (step S1303: YES), the user terminal Ti transmits to the management server 101, an acquisition request for the pairing information of the detected peripheral device Mj (step S1304).

The user terminal Ti determines whether an authentication request has been received from the management server 101 (step S1305). Here, when an authentication request has been received (step S1305: YES), user terminal Ti displays a login screen on the display 503 (step S1306). The user terminal Ti, when authentication information is input into the login screen, transmits the input authentication information to the management server 101 (step S1307).

Next, the user terminal Ti determines whether pairing information associated with the transmitted acquisition request has been received from the management server 101 (step S1308). Here, if the pairing information has not been received (step S1308: NO), user terminal Ti transitions to step S1310.

On the other hand, if the pairing information has been received (step S1308: YES), the user terminal Ti stores the received pairing information as connection destination information to the connection destination information DB 350 (step S1309), and transitions to step S1401 depicted in FIG. 14.

Further, at step S1305, if an authentication request has not been received (step S1305: NO), the user terminal Ti displays the device icon representing the peripheral device Mj grayed out on the display 503 (step S1310). The user terminal Ti determines whether the device icon has been tapped (step S1311).

If the device icon has not been tapped (step S1311: NO), the user terminal Ti returns to step S1310. On the other hand, if the device icon has been tapped (step S1311: YES), the user terminal Ti returns to step S1304.

In the flowchart depicted in FIG. 14, first, the user terminal Ti transmits a connection request to the detected peripheral device Mj (step S1401). The user terminal Ti determines whether a connection response (pairing requirement) corresponding to the connection request has been received from the peripheral device Mj (step S1402).

If a connection response has not been received (step S1402: NO), the user terminal Ti returns to step S1310 depicted in FIG. 13. On the other hand, if a connection response has been received (step S1402: YES), user terminal Ti searches the connection destination information DB 350 for connection destination information, using the device address of the peripheral device Mj as a key (step S1403).

The user terminal Ti sets the terminal address included in the retrieved connection destination information as the transmission source address of a communication packet, encrypts the communication packet by the pairing key included in the connection destination information peripheral, and transmits the encrypted communication packet to the peripheral device Mj (step S1404).

The user terminal Ti determines whether a response encrypted by the shared pairing key has been received from the peripheral device Mj (step S1405). If no response encrypted by the shared pairing key has been received (step S1405: NO), the user terminal Ti returns to step S1310 depicted in FIG. 13.

On the other hand, when a response encrypted by a common pairing key has been received (step S1405: YES), the user terminal Ti displays a device icon representing the peripheral device Mj overlaid on the display 503 (step S1406). Next, the user terminal Ti determines whether the application has been terminated (step S1407).

Here, the user terminal Ti stands by until the application is terminated (step S1407: NO). When the application has been terminated (step S1407: YES), the user terminal Ti deletes therein the pairing information associated with the device (step S1408). Next, the user terminal Ti transmits to the management server 101, a utilization termination notification concerning the peripheral device Mj (step S1409), ending a series of operations according to the present flowchart.

As a result, pairing information of a peripheral device Mj present within a short-range wireless communication range may be acquired from the management server 101, enabling pairing with the peripheral device Mj.

As described above, according to the user terminal Ti of the first embodiment, when a peripheral device Mj capable of performing short-range wireless communication with the user terminal Ti is detected, an acquisition request for the pairing information of the peripheral device Mj may be transmitted to the management server 101. As a result, pairing information generated by a pairing process of the management terminal Ti and the peripheral device Mj may be requested from the management server 101.

Further, according to the user terminal Ti, when the pairing information associated with the acquisition request is received from the management server 101, data communication may be performed with the peripheral device Mj, based on the pairing information. As a result, the user terminal Ti may communicate with the peripheral device Mj under the guise of the management terminal Ti, enabling pairing with the peripheral device Mj without performing a general pairing operation.

Further, according to the user terminal Ti, when authentication information is transmitted to the management server 101 in response to an authentication request received from the management server 101 and the user terminal Ti is authenticated based on the authentication information, pairing information associated with the acquisition request may be received from the management server 101. As a result, acquisition of the pairing information of the peripheral device Mj by a third party that is not a proper user maybe prevented, enabling security to be enhanced.

Further, according to the user terminal Ti, determination may be made as to whether connection destination information associated with the device address of a detected peripheral device Mj is stored in the connection destination information DB 350. As a result, before an acquisition request for the pairing information is transmitted to the management server 101, determination may be made as to whether the pairing information of the peripheral device Mj has already been received from the management server 101.

Further, according to the user terminal Ti, when the pairing information associated with the peripheral device Mj is stored, data communication with the peripheral device Mj may be performed based on the pairing information. As a result, when the peripheral device Mj is a device that does not update the key, once the pairing information has been acquired, data communication with the peripheral device Mj may be performed using the pairing information, omitting exchanges with the management server 101.

Further, according to the user terminal Ti, when the encryption key of a peripheral device Mj is updated during data communication with the peripheral device Mj, a key update request concerning the peripheral device Mj may be transmitted to the management server 101. As a result, the pairing information of the peripheral device Mj managed by the management server 101 may be updated with the updating of the encryption key (pairing key) of the peripheral device Mj.

Thus, according to the pairing management system 300 of the first embodiment, once the manager performs a pairing operation, thereafter, a peripheral device Mj may be used without the user performing a bothersome pairing operation. As a result, in business-use standardized to a certain extent, a troublesome pairing operation by a user may be omitted, enabling decreases in work efficiency to be prevented. Further, the present pairing management method enables convenience during implementation to be enhanced since the method is applicable even when the user terminal Ti is a device of a different type from the management terminal Ti.

The pairing management system 300 according to a second embodiment will be described. Portions identical to those of the first embodiment are given the same reference numerals used in the first embodiment and description thereof will be omitted hereinafter.

As peripheral devices that can be used by the user terminal Ti, multiple peripheral devices of the same type may be installed. For example, multiple printers may be installed in an office. In such a case, if the user is unable to discern which printers are paired with the terminal (user terminal Ti) thereof, the user cannot recognize usable printers among the multiple printers.

Further, in a print screen or the like, the device names of usable printers are displayed in a selectable manner, from which the user selects the device name of a printer to be used. However, if the user does not know the corresponding installation sites and device names of the printers, the selection of the device name of the printer that the user wants to use is difficult.

Thus, in the second embodiment, a pairing management method will be described in which a seal affixed to the peripheral device Mj is used, facilitating recognition (by the user) of the peripheral devices Mj paired with the user terminal Ti.

Storage contents of the pairing information DB 330 of the management server 101 according to the second embodiment will be described.

Figure 15:
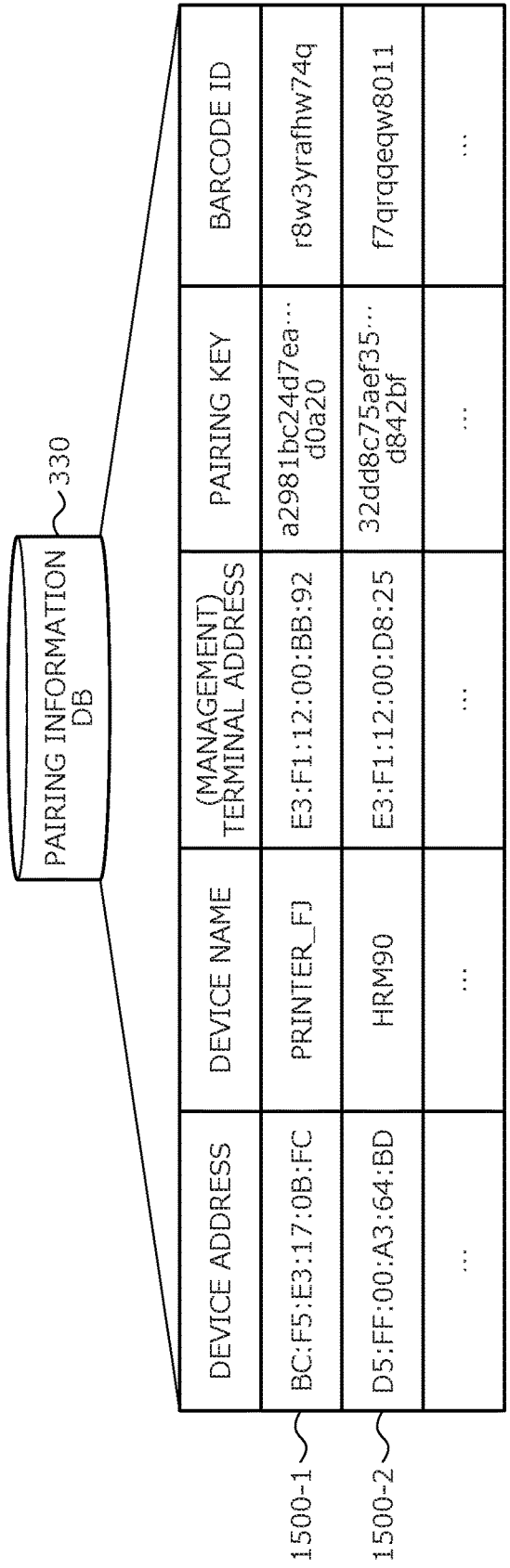
FIG. 15 is a diagram (part 2) of an example of the storage contents of the pairing information DB 330.

FIG. 15 is a diagram (part 2) of an example of the storage contents of the pairing information DB 330. In FIG. 15, the pairing information DB 330 has fields for device addresses, device names, terminal addresses, pairing keys, and barcode IDs. Information is set into each of the fields whereby pairing information (e.g., pairing information 1500-1, 1500-2) is stored as records.

Here, the device address is the address of a peripheral device Mj. The device name is the name of the peripheral device Mj. The terminal address is the address of the management terminal Ti paired with the peripheral device Mj. The pairing key is an encryption key generated by a pairing process of the management terminal Ti and the peripheral device Mj. The barcode ID is identification information uniquely identifying the peripheral device Mj.

An example of the pairing management method according to the second embodiment will be described. Here, as an example, the management terminal Ti is assumed to be a "management terminal T1", and the user terminal Ti is assumed to be a "user terminal T2".

Figure 16:
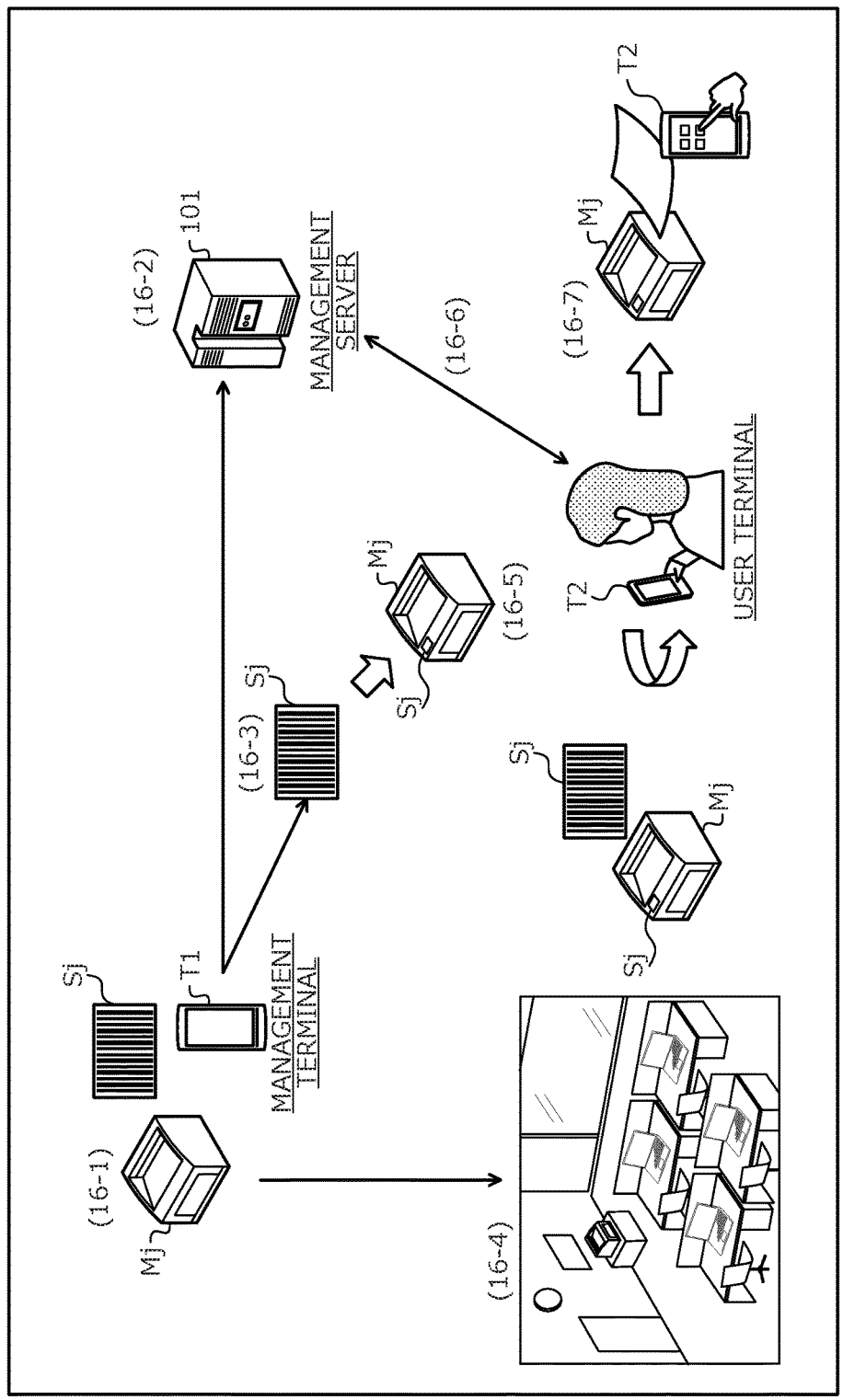
FIG. 16 is a diagram of an example of the pairing management method according to a second embodiment.

FIG. 16 is a diagram of an example of the pairing management method according to the second embodiment.

(16-1) The manager, at the time of purchase of a peripheral device Mj, generates a barcode in which a registered barcode ID uniquely identifying the peripheral device Mj is recorded and prints the generated barcode on a seal Sj. The manager carries out pairing of the management terminal T1 and the peripheral device Mj. As a result, pairing information generated by the pairing process of the management terminal T1 and the peripheral device Mj is transmitted to the management server 101.

The pairing information includes the barcode ID obtained by reading the seal Sj. Here, although a "barcode" is used as a code uniquely identifying the peripheral device Mj, for example, a 2-dimensional code such as a QR code may be used. Further, a wireless tag such as a radio frequency identifier (RFID) tag or an NFC tag may be used, and the reading of the identifier uniquely identifying the peripheral device Mj may be by a reading apparatus of the management terminal Ti.

(16-2) The management server 101, when receiving the pairing information from the management terminal T1, stores the received pairing information to the pairing information DB 330 depicted in FIG. 15.

(16-3) The manager affixes the printed seal Sj to the peripheral device Mj.

(16-4) The manager installs in an office, the peripheral device Mj affixed with the seal Sj.

Here, a case is assumed in which the peripheral device Mj installed in the office is to be used by the user of the user terminal T2.

(16-5) The user uses the camera 507 (refer to FIG. 5) of the user terminal T2 and reads the barcode printed on the seal Sj affixed to the peripheral device Mj that the user wants to use. In particular, for example, the user terminal T2, when the camera 507 is started up, detects a peripheral device Mj capable of performing short-range wireless communication with the user terminal T2.

Next, the user terminal T2 receives by an input operation by the user of the input apparatus 504 (refer to FIG. 5), a read instruction concerning the barcode in the finder screen of the camera 507. The user terminal T2, in response to the received read instruction, reads the barcode printed on the seal Sj and thereby, acquires the barcode ID recorded in the barcode. As a result, the user terminal T2 may acquire the barcode ID uniquely identifying the peripheral device Mj.

(16-6) The user terminal T2 transmits to the management server 101, an acquisition request for pairing information of the peripheral device Mj specified by the acquired barcode ID. The acquisition request includes the acquired barcode ID.

The management server 101, when receiving the acquisition request for the pairing information from the user terminal T2, extracts from the pairing information DB 330 (refer to FIG. 15), pairing information associated with the barcode ID included in the received acquisition request. The management server 101 transmits the extracted pairing information to the user terminal T2.

For example, when the barcode ID "r8w3yrafhw74q" is included in the acquisition request, the management server 101 extracts the pairing information 1500-1 from the pairing information DB 330 (refer to FIG. 15). In this case, the management server 101 transmits the extracted pairing information 1500-1 to the user terminal T2.

(16-7) When receiving from the management server 101, the pairing information associated with the acquisition request, the user terminal T2 performs data communication with the peripheral device Mj, based on the received pairing information. As a result, by a mere reading of the seal Sj affixed to the peripheral device Mj, the user terminal T2 and the peripheral device Mj are paired, enabling use of the peripheral device Mj.

The pairing management process procedure of the user terminal Ti according to the second embodiment will be described.

Figure 17:
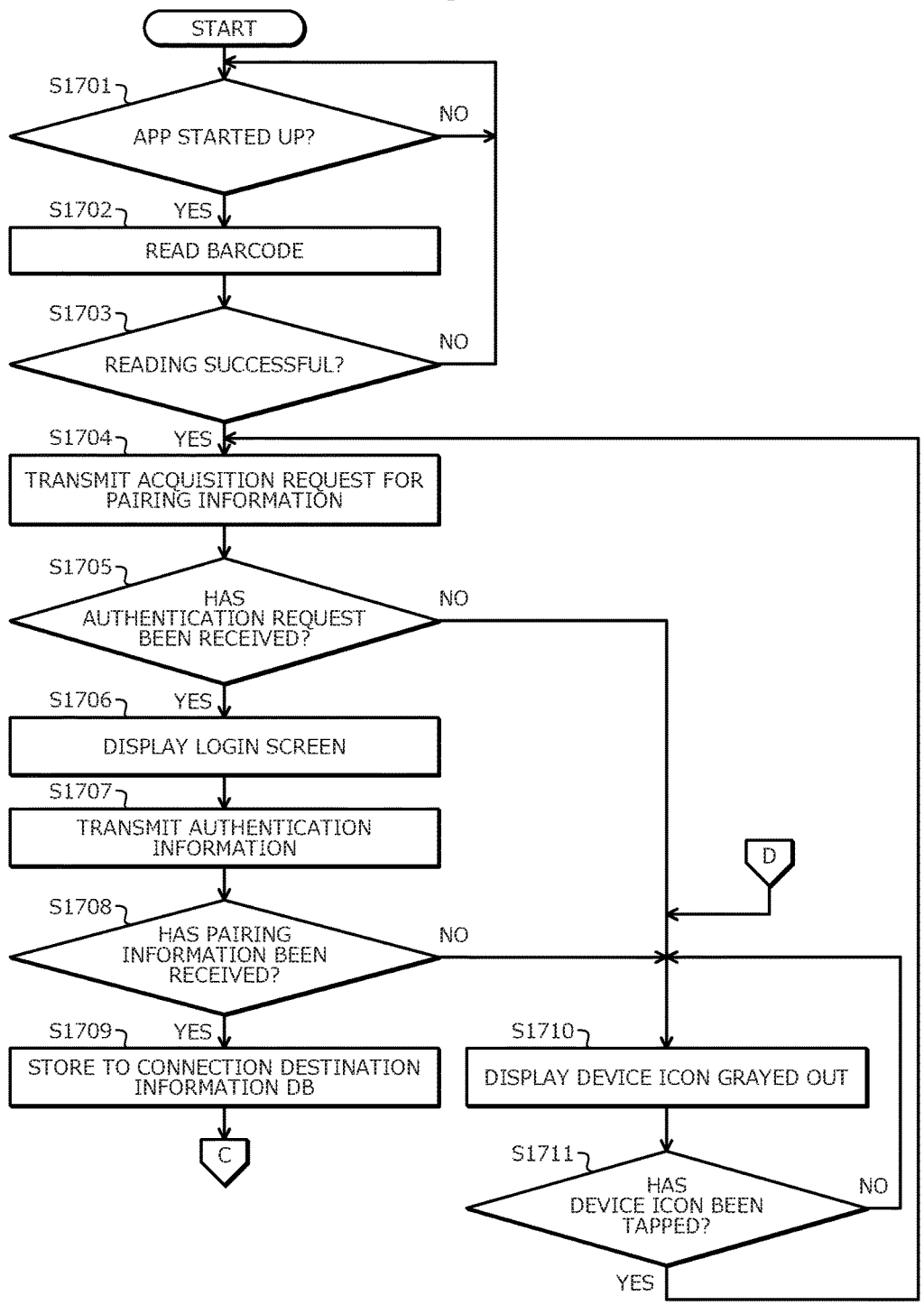
FIG. 17 is a flowchart (part 1) of an example of the pairing management process procedure of the user terminal Ti according to the second embodiment.
Figure 18:
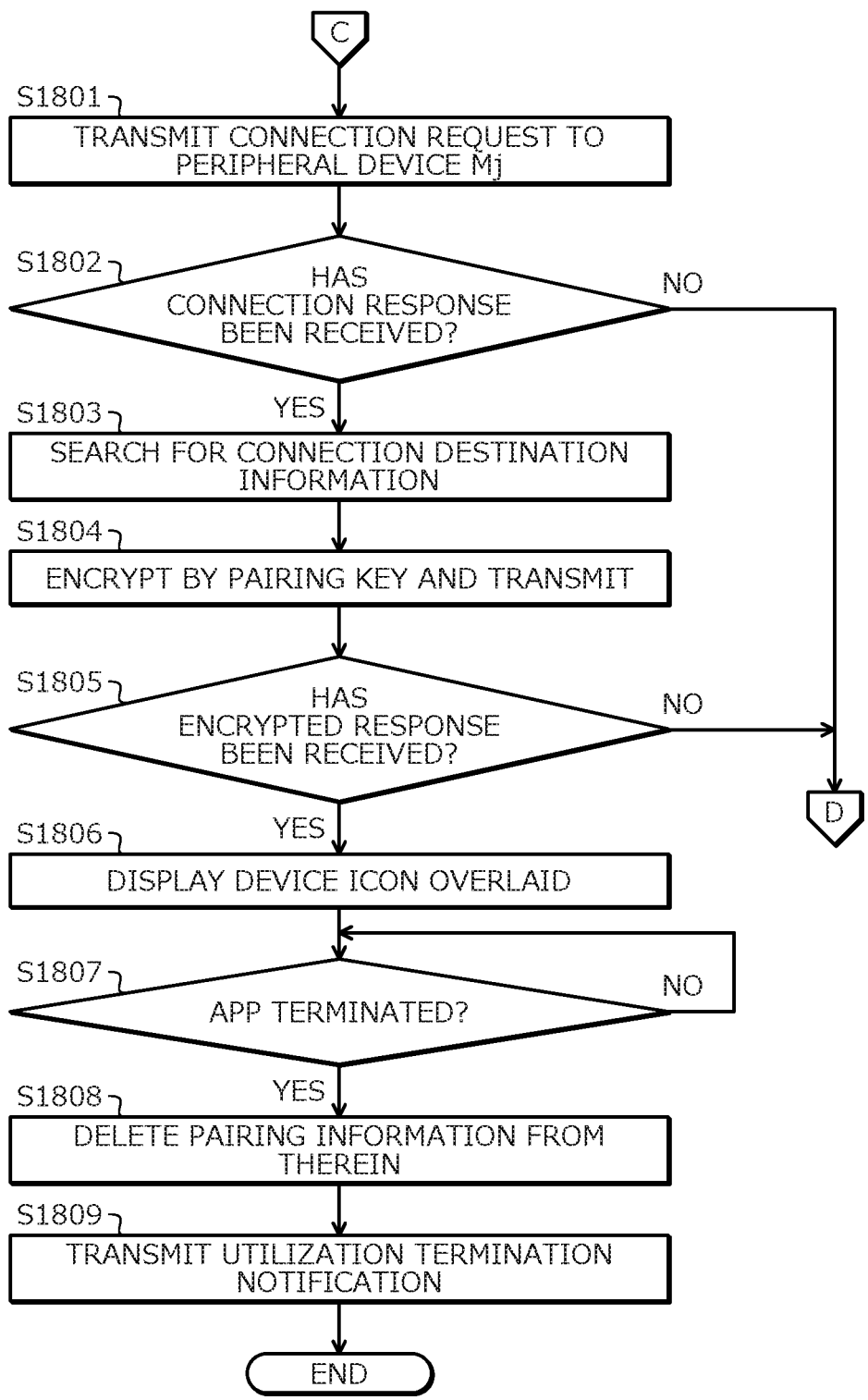
FIG. 18 is a flowchart (part 2) of an example of the pairing management process procedure of the user terminal Ti according to the second embodiment.

FIGS. 17 and 18 are flowcharts of an example of the pairing management process procedure of the user terminal Ti according to the second embodiment. As depicted in FIG. 17, first, the user terminal Ti determines whether an application has been started up (step S1701). Here, the user terminal Ti stands by until an application is started up (step S1701: NO).

When an application has been started up (step S1701: YES), the user terminal Ti reads the barcode printed on the seal Sj affixed to the peripheral device Mj (step S1702). The user terminal Ti determines whether reading of the barcode printed on the seal Sj was successful (step S1703).

If the reading failed (step S1703: NO), the user terminal Ti returns to step S1701. On the other hand, if the reading was successful (step S1703: YES), the user terminal Ti transmits to the management server 101, an acquisition request for pairing information that includes the barcode ID obtained by reading the barcode (step S1704).

The user terminal Ti determines whether an authentication request has been received from the management server 101 (step S1705). If an authentication request has been received (step S1705: YES), the user terminal Ti displays a login screen on the display 503 (step S1706). The user terminal Ti, when receiving input of authentication information in the login screen, transmits the input authentication information to the management server 101 (step S1707).

The user terminal Ti determines whether pairing information associated with the acquisition request has been received from the management server 101 (step S1708). If pairing information has not been received (step S1708: NO), the user terminal Ti transitions to step S1710.

On the other hand, if pairing information has been received (step S1708: YES), the user terminal Ti stores the pairing information as connection destination information into the connection destination information DB 350 (step S1709), and transitions to step S1801 depicted in FIG. 18.

At step S1705, if an authentication request has not been received (step S1705: NO), the user terminal Ti displays a device icon representing the peripheral device Mj grayed out on the display 503 (step S1710). The user terminal Ti determines whether the device icon has been tapped (step S1711).

If the device icon has not been tapped (step S1711: NO), the user terminal Ti returns to step S1710. On the other hand, if the device icon has been tapped (step S1711: YES), the user terminal Ti returns to step S1704.

In the flowchart depicted in FIG. 18, first, the user terminal Ti transmits a connection request to the detected peripheral device Mj (step S1801). The user terminal Ti determines whether a connection response (pairing requirement) for the connection request has been received from the peripheral device Mj (step S1802).

If no connection response has been received (step S1802: NO), the user terminal Ti returns to step S1710 depicted in FIG. 17. On the other hand, if a connection response has been received (step S1802: YES), the user terminal Ti searches the connection destination information DB 350 for connection destination information, using the device address of the peripheral device Mj as a key (step S1803).

The user terminal Ti sets the terminal address included in the retrieved connection destination information as the transmission source address of the communication packet, encrypts a communication packet by the pairing key included in the connection destination information, and transmits the encrypted communication packet to the peripheral device Mj (step S1804).

The user terminal Ti determines whether a response encrypted by the shared pairing key has been received from the peripheral device Mj (step S1805). If no response encrypted by the shared pairing key has been received (step S1805: NO), the user terminal Ti returns to step S1710 depicted in FIG. 17.

On the other hand, if a response encrypted by the shared pairing key has been received (step S1805: YES), the user terminal Ti displays the device icon representing the peripheral device Mj overlaid on the display 503 (step S1806). Next, the user terminal Ti determines whether the application has been terminated (step S1807).

Here, the user terminal Ti stands by until the application is terminated (step S1807: NO). When the application has been terminated (step S1807: YES), the user terminal Ti deletes therein the pairing information associated with the device (step S1808). Next, the user terminal Ti transmits to the management server 101, a utilization termination notification concerning the peripheral device Mj (step S1809), ending a series of operations according to the present flowchart.

As a result, the pairing information of the peripheral device Mj specified by the barcode ID obtained by reading the seal Sj is acquired from the management server 101, enabling pairing with the peripheral device Mj.

As described above, according to the user terminal Ti of the second embodiment, in response to a read instruction from the user, the seal Sj affixed to a peripheral device Mj may be read. Further, according to the user terminal Ti, an acquisition request for the pairing information of the peripheral device Mj specified by the barcode ID obtained by reading the seal Sj may be transmitted to the management server 101.

As a result, the user may merely use the camera 507 of the user terminal Ti to read the seal Sj affixed to a peripheral device Mj and thereby, performing pairing of the user terminal Ti and the peripheral device Mj. Further, since the user issues the read instruction, it is clear with which peripheral device Mj pairing is performed and so even when multiple peripheral devices of the same type are installed in an environment, a peripheral device Mj that may be used is easily recognized.

The pairing management system 300 according to a third embodiment will be described. Parts identical to those described in the first and second embodiments will be given the same reference numerals used in the first and second embodiments, and description thereof will be omitted hereinafter.

Here, depending on the peripheral device Mj, only one user terminal may be connected to the peripheral device Mj at any given time whereby sharing of the peripheral device Mj by multiple user terminals may be difficult. Thus, in the third embodiment, a case will be described in which the management server 101 performs arbitration and switches the user terminal that is to use a peripheral device Mj, when multiple user terminals attempt to concurrently use the peripheral device Mj.

Storage contents of the pairing information DB 330 of the management server 101 according to the third embodiment will be described.

Figure 19:
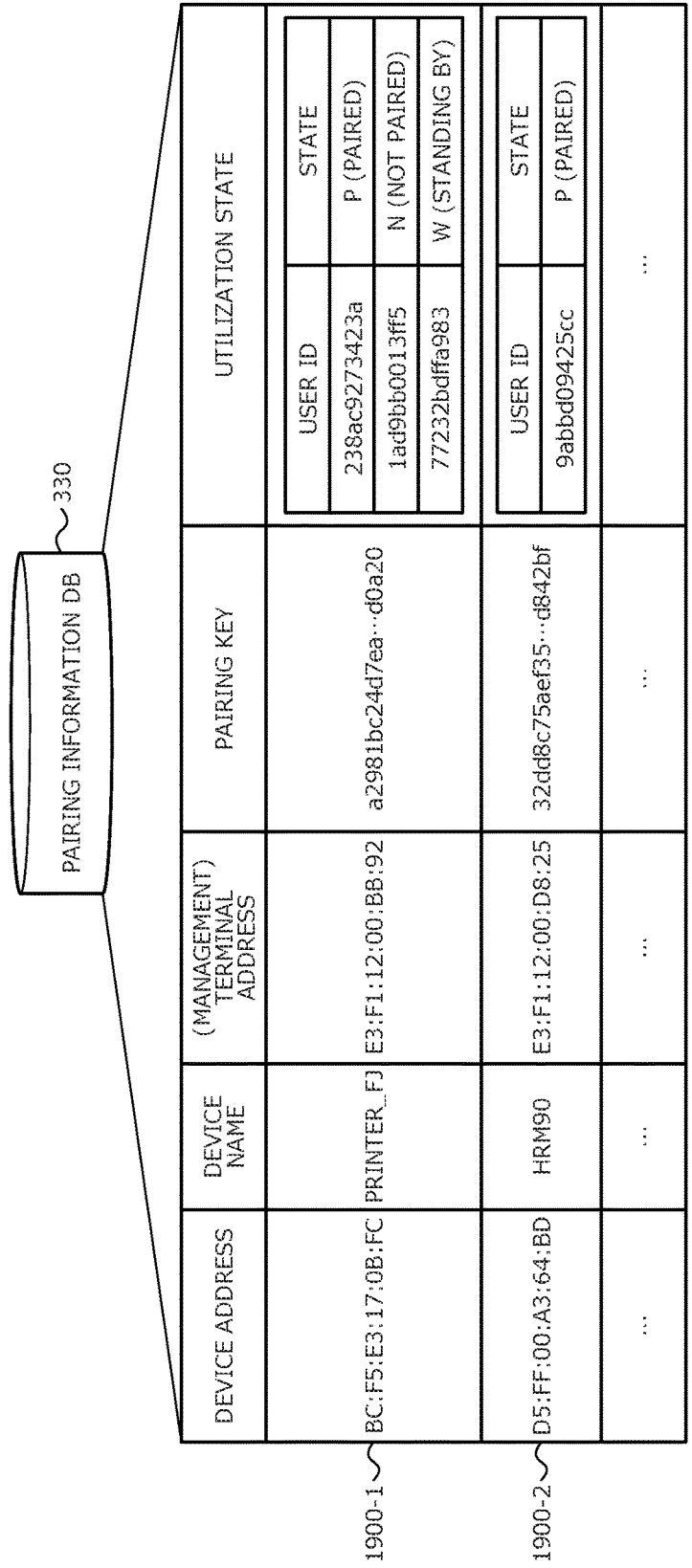
FIG. 19 is a diagram (part 3) of an example of the storage contents of the pairing information DB 330.

FIG. 19 is a diagram (part 3) of an example of the storage contents of the pairing information DB 330. In FIG. 19, the pairing information DB 330 has fields for device addresses, device names, terminal addresses, pairing keys, and utilization states. Information is set into each of the fields whereby pairing information (e.g., pairing information 1900-1, 1900-2) is stored as records.

Here, the device address is the address of a peripheral device Mj. The device name is the name of the peripheral device Mj. The terminal address is the address of the management terminal Ti paired with the peripheral device Mj. The pairing key is an encryption key generated by a pairing process of the management terminal Ti and the peripheral device Mj.

The utilization state represents a utilization state of the peripheral device Mj by a user terminal Ti identified by the user ID. Here, any one of "P", "N", and "W" states is set as the utilization state. State "P" indicates that the user terminal Ti and the peripheral device Mj are paired. The state "N" indicates that the user terminal Ti and the peripheral device Mj are not paired (non-paired). The state "W" indicates that the user terminal Ti is awaiting (standing by for) pairing with the peripheral device Mj.

An example of the pairing management method according to the third embodiment will be described. Here, as an example, multiple user terminals attempting to use a peripheral device Mj concurrently are assumed to be the "user terminal T2 and a "user terminal T3".

Figure 20:
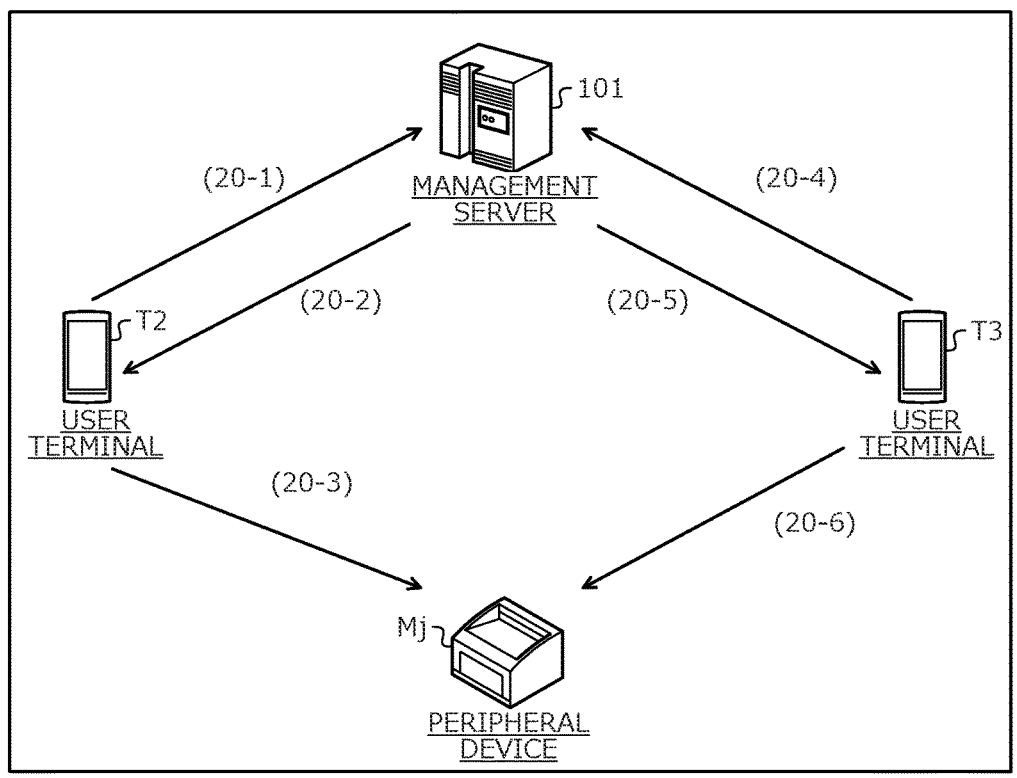
FIG. 20 is a diagram (part 1) of an example of the pairing management method according to a third embodiment.

FIG. 20 is a diagram (part 1) of an example of the pairing management method according to the third embodiment. First, a case in which the user terminal T2 uses the peripheral device Mj is assumed.

(20-1) The user terminal T2 transmits to the management server 101, an acquisition request for the pairing information of a detected peripheral device Mj.

(20-2) The management server 101, when receiving the acquisition request for the pairing information, refers to the pairing information DB 330 (refer to FIG. 19) and determines the utilization state of the peripheral device Mj specified by the received acquisition request for the pairing information.

In particular, for example, the management server 101 determines that the peripheral device Mj is not being used when in the utilization state field for the peripheral device Mj, no user ID is set for state "P". In this case, the management server 101 extracts from the pairing information DB 330 (refer to FIG. 19), pairing information associated with the received acquisition request and transmits the extracted pairing information to the user terminal T2.

On the other hand, the management server 101 determines that the peripheral device Mj is being used when in the utilization state field of the peripheral device Mj, a user ID has been set for state "P". In this case, the management server 101 transmits to the user terminal T2, state information indicating that the peripheral device Mj is being used.

Here, the peripheral device Mj is assumed to not be in use. In other words, the management server 101 extracts from the pairing information DB 330 (refer to FIG. 19), pairing information of the peripheral device Mj and transmits the extracted pairing information to the user terminal T2. The management server 101 updates the utilization state of the peripheral device Mj in the pairing information DB 330 (refer to FIG. 19). In particular, for example, the management server 101 sets the user ID of the user terminal T2 and state "P" in the utilization state field of the peripheral device Mj.

(20-3) The user terminal T2, when receiving from the management server 101, the pairing information associated with the acquisition request, performs data communication with the peripheral device Mj, based on the received pairing information. Here, when the pairing of the user terminal T2 and the peripheral device Mj is completed, a device icon indicating that the peripheral device Mj may be used is displayed at the user terminal T2 (e.g., an application screen 2402 depicted in FIG. 24 described hereinafter).

As a result, the user terminal T2 and the peripheral device Mj are paired, enabling use of the peripheral device Mj.

Next, a case is assumed in which the user terminal T3 uses the peripheral device Mj being used by the user terminal T2.

(20-4) The user terminal T3 transmits to the management server 101, an acquisition request for the pairing information of a detected peripheral device Mj.

(20-5) The management server 101, when receiving the acquisition request for the pairing information, refers to the pairing information DB 330 (refer to FIG. 19) and determines the utilization state of the peripheral device Mj specified by the received acquisition request for the pairing information.

Here, the peripheral device Mj is being used by the user terminal T2. Therefore, the management server 101 transmits to the user terminal T3, state information indicating that the peripheral device Mj is being used. The management server 101 updates the utilization state of the peripheral device Mj in the pairing information DB 330 (refer to FIG. 19). In particular, for example, the management server 101 sets in the utilization state field of the peripheral device Mj, the user ID of the user terminal T3 and state "N".

(20-6) The user terminal T3, when receiving from the management server 101, the state information indicating that the peripheral device Mj is being used, continues processing without transmitting a connection request to the peripheral device Mj. Here, a device icon indicating that the peripheral device Mj may be used is displayed at the user terminal T3 (e.g., an application screen 2502 depicted in FIG. 25 described hereinafter) so as to appear as if connection with the peripheral device Mj has been completed.

As a result, even though in actuality only the user terminal T2 is paired with the peripheral device Mj, at the user terminal T3, the peripheral device Mj may be used, i.e., it may be made to appear as though multiple user terminals (the user terminals T2, T3) may concurrently use the peripheral device Mj.

A first switching example will be described in which the peripheral device Mj being used by the user terminal T2 is switched to a state enabling use by the user terminal T3. In the first switching example, when access from an application of the user terminal T3 to the peripheral device Mj occurs, the pairing counterpart of the peripheral device Mj is switched from the user terminal T2 to the user terminal T3.

Figure 21:
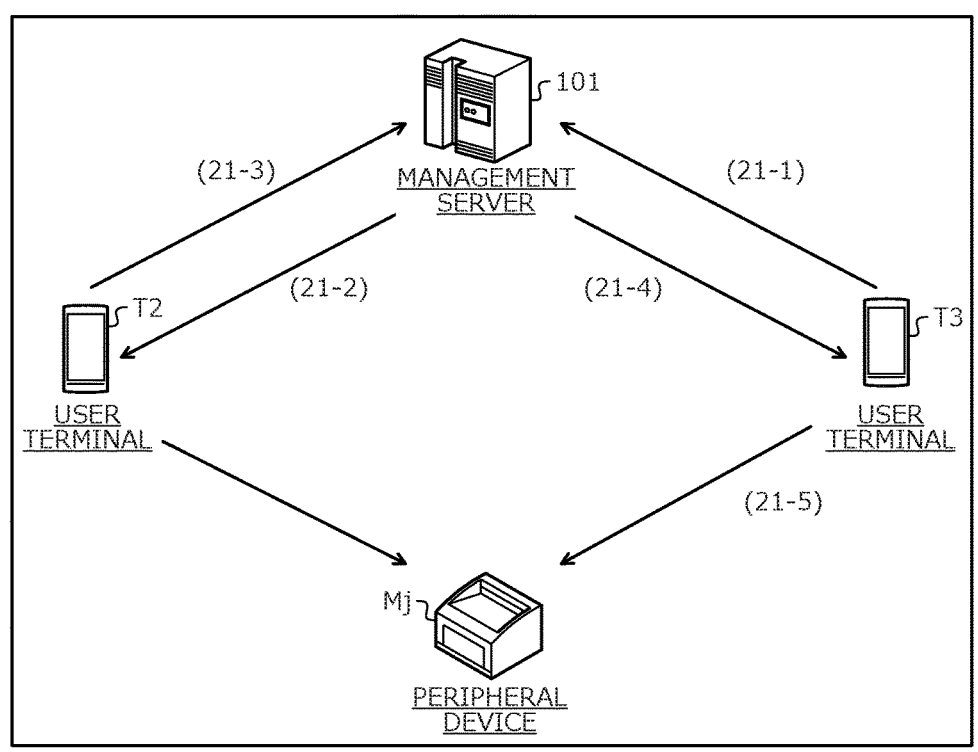
FIG. 21 is a diagram (part 2) of an example of the pairing management method according to the third embodiment.

FIG. 21 is a diagram (part 2) of an example of the pairing management method according to the third embodiment.

(21-1) The user terminal T3, in response to an access request to the peripheral device Mj from an application, again transmits to the management server 101, an acquisition request for the pairing information of the peripheral device Mj.

(21-2) The management server 101, when receiving the acquisition request for the pairing information, refers to the pairing information DB 330 (refer to FIG. 19), and determines the utilization state of the peripheral device Mj specified by the received acquisition request for the pairing information. Here, the peripheral device Mj is being used by the user terminal T2.

In this case, the management server 10 transmits a pairing release request to the user terminal T2. Here, the pairing release request requests the release of pairing with the peripheral device Mj.

(21-3) The user terminal T2, when receiving the pairing release request from the management server 101, determines whether release of the pairing with the peripheral device Mj is possible. In particular, for example, the user terminal T2 determines that it is not possible to release the pairing with the peripheral device Mj, when an application is using the peripheral device Mj. In this case, the user terminal T2 transmits to the management server 101, notification that pairing release is impossible.

On the other hand, when no application is using the peripheral device Mj, the user terminal T2 determines that release of the pairing with the peripheral device Mj is possible. In this case, the user terminal T2 releases the pairing with the peripheral device Mj and transmits notification of pairing release completion to the management server 101.

Here, a case is assumed in which the user terminal T2 is able to release the pairing with the peripheral device Mj. Therefore, the user terminal T2 releases the pairing with the peripheral device Mj and transmits notification of pairing release completion to the management server 101.

(21-4) The management server 101, when receiving the notification of pairing release completion from the user terminal T2, extracts from the pairing information DB 330 (refer to FIG. 19), the pairing information of the peripheral device Mj and transmits the extracted pairing information to the user terminal T3. The management server 101 updates the utilization state of the peripheral device Mj in the pairing information DB 330 (refer to FIG. 19). In particular, for example, the management server 101 deletes from the utilization state field of the peripheral device Mj, the user ID of the user terminal T2 and state "P". Further, the management server 101 changes the state associated with the user ID of the user terminal T3 to "P".

When receiving from the user terminal T2, notification that pairing release is impossible, the management server 101 again transmits to the user terminal T3, state information indicating that the peripheral device Mj is being used. The management server 101, in the utilization state field of peripheral device Mj in the pairing information DB 330 (refer to FIG. 19), changes the state associated with the user ID of the user terminal T3 to "W".

(21-5) The user terminal T3, when receiving from the management server 101, the pairing information associated with the acquisition request, performs data communication with the peripheral device Mj, based on the received pairing information. As a result, the user terminal T3 and the peripheral device Mj are paired, enabling use of the peripheral device Mj.

The user terminal T3, when again receiving from the management server 101, the state information indicating that the peripheral device Mj is being used, for example, may display on the display 503, a message (e.g., a message 2503 depicted in FIG. 25 described hereinafter) indicating "Please wait a moment until the peripheral device becomes available." The user terminal T3 may perform the operation at (21-1) each time an access request for the peripheral device Mj is received from the application.

A second switching example will be described in which the peripheral device Mj being used by the user terminal T2 is switched to a state enabling use by the user terminal T3. In the second switching example, in response to an application screen of the user terminal T3 being in a displayed state, the pairing counterpart of the peripheral device Mj is switched from the user terminal T2 to the user terminal T3.

Figure 22:
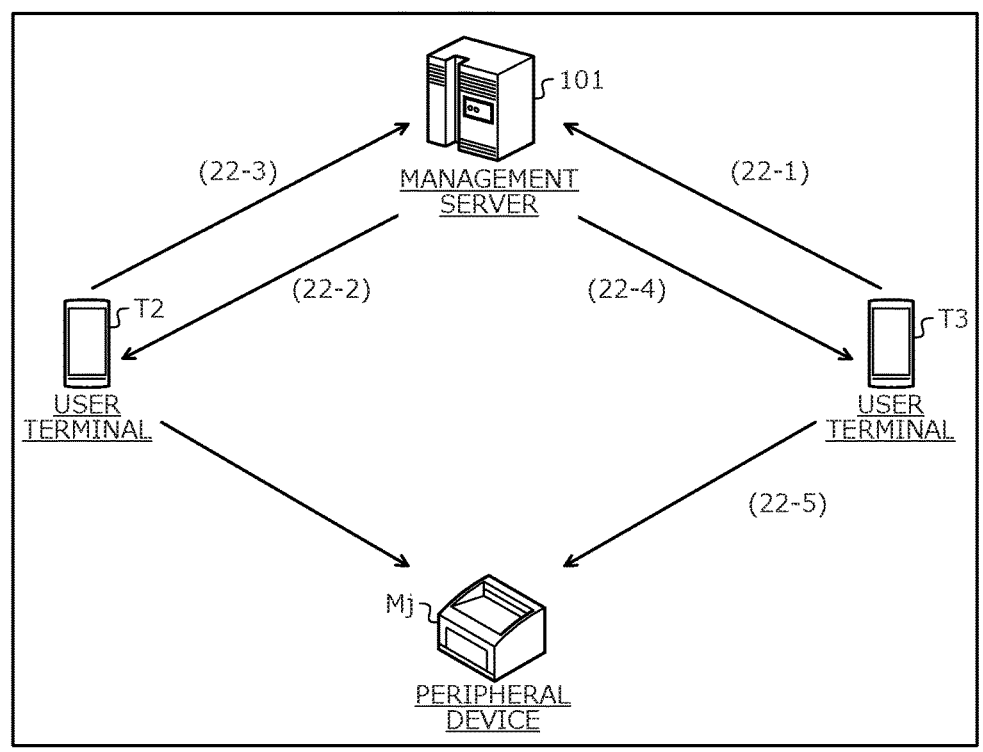
FIG. 22 is a diagram (part 3) of an example of the pairing management method according to the third embodiment.

FIG. 22 is a diagram (part 3) of an example of the pairing management method according to the third embodiment.

(22-1) The user terminal T3, in response to an application screen becoming active, again transmits to the management server 101, an acquisition request for the pairing information of the peripheral device Mj. Here, an application screen becoming active is a state when the user performs an operation such as input in an application screen, i.e., the application screen is displayed topmost.

(22-2) The management server 101, when again receiving an acquisition request for pairing information, refers to the pairing information DB 330 (refer to FIG. 19), and determines the utilization state of the peripheral device Mj specified by the received acquisition request for pairing information. Here, the peripheral device Mj is being used by the user terminal T2. In this case, the management server 101 transmits a pairing release request to the user terminal T2.

(22-3) The user terminal T2, when receiving the pairing release request from the management server 101, determines whether release of the pairing with the peripheral device Mj is possible. In particular, for example, the user terminal T2 determines that release of the pairing with the peripheral device Mj is not possible, when an application screen is active. In this case, the user terminal T2 transmits to the management server 101, notification that release of the pairing is impossible.

On the other hand, when no application screen is active, the user terminal T2 determines that release of the pairing with the peripheral device Mj is possible. In this case, the user terminal T2 releases the pairing with the peripheral device Mj and transmits notification of pairing release completion to the management server 101.

Here, a case is assumed in which the user terminal T2 is able to release the pairing with the peripheral device Mj. Therefore, the user terminal T2 releases the pairing with the peripheral device Mj and transmits notification of pairing release completion to the management server 101.

(22-4) The management server 101, when receiving the notification of pairing release completion from the user terminal T2, extracts from the pairing information DB 330 (refer to FIG. 19), the pairing information of the peripheral device Mj and transmits the extracted pairing information to the user terminal T3. The management server 101 updates the utilization state of the peripheral device Mj in the pairing information DB 330 (refer to FIG. 19). In particular, for example, the management server 101 deletes from the utilization state field of the peripheral device Mj, the user ID of the user terminal T2 and state "P". Further, the management server 101 changes the state associated with the user ID of the user terminal T3 to "P".

When receiving from the user terminal T2, notification that release of the pairing is impossible, the management server 101 again transmits to the user terminal T3, state information indicating that the peripheral device Mj is being used. The management server 101, in the utilization state field of the peripheral device Mj in the pairing information DB 330 (refer to FIG. 19), changes the state associated with the user ID of the user terminal T3 to "W".

(22-5) The user terminal T3, when receiving from the management server 101, the pairing information associated with the acquisition request, performs data communication with the peripheral device Mj, based on the received pairing information. As a result, the user terminal T3 and the peripheral device Mj are paired, enabling use of the peripheral device Mj.

The user terminal T3, when again receiving from the management server 101, state information indicating that the peripheral device Mj is being used, for example, may display on the display 503, a message "Please wait a moment until the peripheral device becomes available." The user terminal T3 may perform the operation at (22-1) each time an access request for the peripheral device Mj is received from the application.

A third switching example will be described in which the peripheral device Mj being used by the user terminal T2 is switched to a state enabling use by the user terminal T3. In the third switching example, in response to release of the pairing of the user terminal T2 and the peripheral device Mj, the pairing counterpart of the peripheral device Mj is switched from the user terminal T2 to the user terminal T3.

Figure 23:
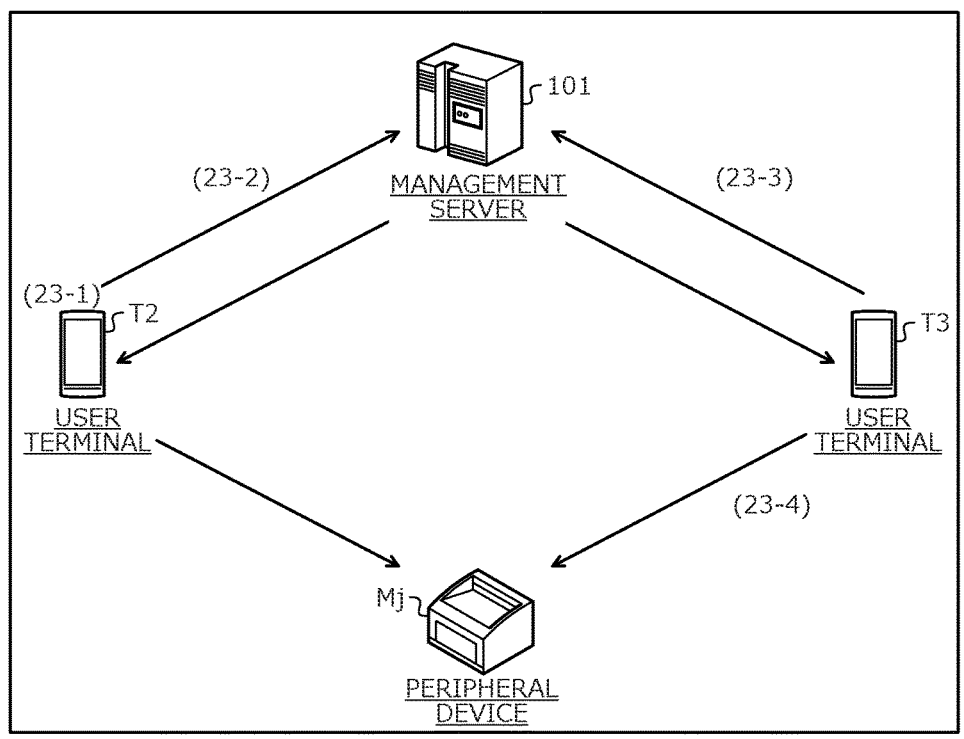
FIG. 23 is a diagram (part 4) of an example of the pairing management method according to the third embodiment.

FIG. 23 is a diagram (part 4) of an example of the pairing management method according to the third embodiment.

(23-1) The user terminal T2 determines whether release of the pairing with the peripheral device Mj is possible. In particular, for example, the user terminal T2 may determine that the release of the pairing with the peripheral device Mj is possible when the user terminal T2 transitions to a sleep state or a screen locked state.

Further, for example, the user terminal T2 may determine that the release of the pairing with the peripheral device Mj is possible when the application using the peripheral device Mj does not access the peripheral device Mj. Further, for example, the user terminal T2 may determine that the release of the pairing with the peripheral device Mj is possible when the application using the peripheral device Mj has been terminated.

Further, for example, the user terminal T2 may determine that the release of the pairing with the peripheral device Mj is possible when another application screen or a home screen has become active. However, another application screen is a screen of an application that does not use the peripheral device Mj.

(23-2) The user terminal T2, when the pairing with the peripheral device Mj has entered a releasable state, releases the pairing with the peripheral device Mj and transmits notification of pairing release completion to the management server 101.

(23-3) The management server 101, when receiving the notification of pairing release completion from the user terminal T2, refers to the pairing information DB 330 (refer to FIG. 19), and determines whether in the utilization state field of the peripheral device Mj, a user ID for state "W" has been set. Here, a case is assumed in which the user ID of the user terminal T3 has been set as the user ID for state "W".

In this case, the management server 101 extracts from the pairing information DB 330 (refer to FIG. 19), the pairing information of the peripheral device Mj and transmits the extracted pairing information to the user terminal T3. The management server 101 updates the utilization state of the peripheral device Mj in the pairing information DB 330 (refer to FIG. 19). In particular, for example, the management server 101 deletes from the utilization state field of the peripheral device Mj, the user ID of the user terminal T2 and state "P". Further, the management server 101 changes the state associated with the user ID of the user terminal T3 to "P".

(23-4) The user terminal T3, when receiving from the management server 101, the pairing information associated with the acquisition request, performs data communication with the peripheral device Mj, based on the received pairing information. As a result, when the user terminal T2 enters a state enabling the pairing with the peripheral device Mj to be released, the pairing counterpart of the peripheral device Mj may be switched from the user terminal T2 to the user terminal T3.

In other words, a peripheral device Mj that in actuality cannot be used by multiple user terminals may be made to appear as if the peripheral device Mj can be used by multiple user terminals (e.g., the user terminals T2, T3) by the management server 101 arbitrating the handing over of pairing information by time-division.

At (23-4) described above, if the user terminal T3 is in a standby state at the time of receiving pairing information from the management server 101, the user terminal T3 may display on the display 503, a message indicating that the peripheral device Mj has become available.

Further, in a case in which the peripheral device Mj is a device assumed for constant use (e.g., headset or mouse), standing by until termination of use at the user terminal T2 is necessary. Determination of whether a peripheral device Mj is a device assumed for constant use, for example, may be determined based on function information (e.g., device profile) of the peripheral device Mj.

Therefore, until use of the peripheral device Mj at the user terminal T2 is terminated, the management server 101 may transmit state information indicating that the peripheral device Mj is being used, in response to an acquisition request for the pairing information from the user terminal T3. The management server 101, when use of the peripheral device Mj at the user terminal T2 is terminated, for example, may transmit to the user terminal T3, a message "Target device has become available for use" and the pairing information of the peripheral device Mj.

Transition examples of various screens displayed on the display 503 of the user terminal Ti will be described. Here, description of transition to various screens will be given taking a case in which the peripheral device Mj is a "printer", and the user terminals T2, T3 simultaneously attempt to use the printer.

Examples of transition to various types of screens displayed on the display 503 of the user terminal T2 will be described.

Figure 24:
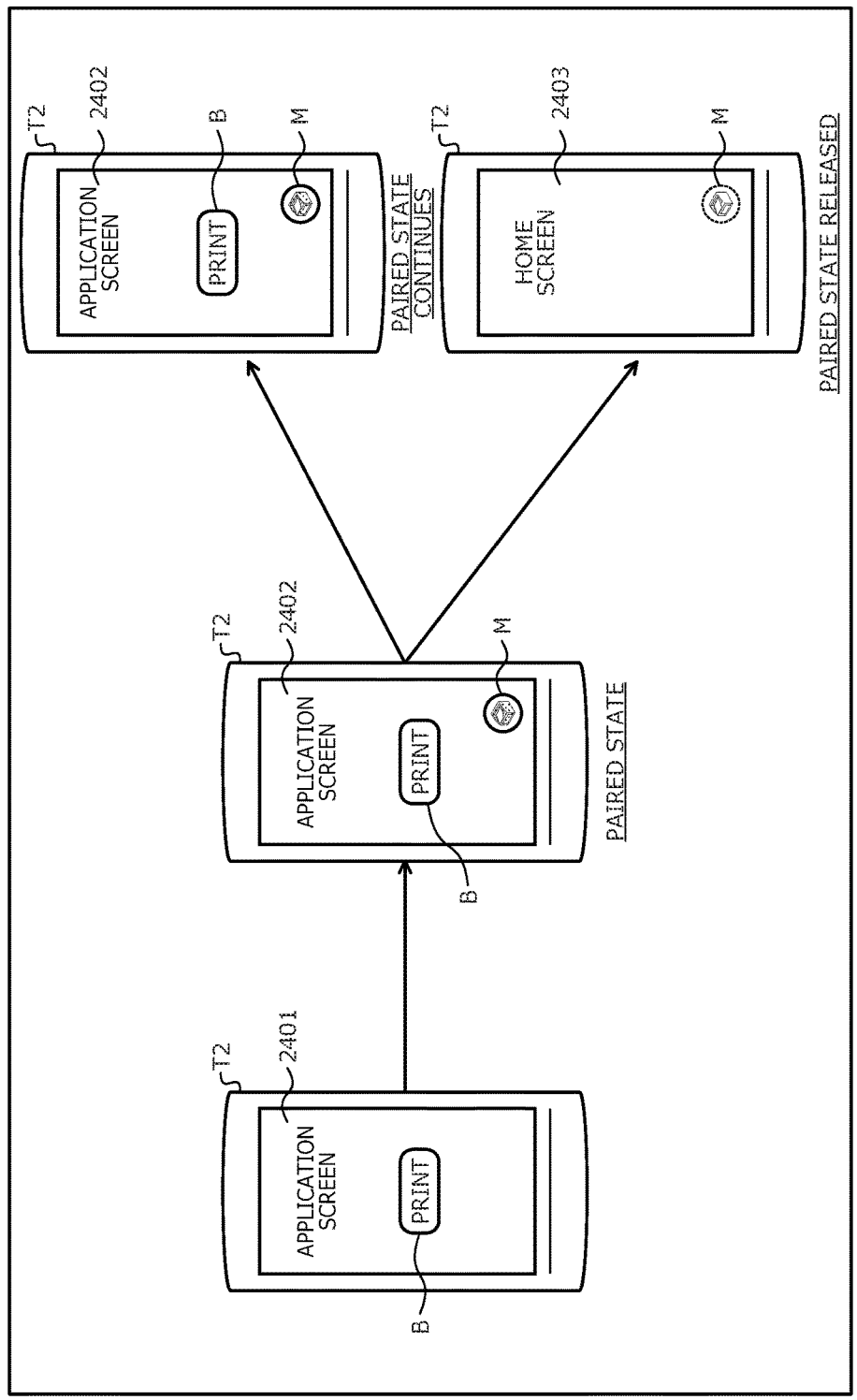
FIG. 24 is a diagram (part 1) of an example of screen transition of the user terminal Ti according to the third embodiment.

FIG. 24 is a diagram (part 1) of an example of screen transition of the user terminal Ti according to the third embodiment. In FIG. 24, an application screen 2401 is an example of a screen displayed on the display 503 at the startup of an application on the user terminal T2.

Here, after the user terminal T2 detects a printer capable of short-range wireless communication, the user terminal T2 is assumed to receive pairing information of the printer from the management server 101 and pairing with the printer is assumed to be completed. In this case, the application screen 2402 is displayed on the display 503 of the user terminal T2. In the application screen 2402, the device icon M representing the printer is displayed overlaid.

Through the application screen 2402, the user may recognize that the printer represented by the device icon M may be used. Further, in the application screen 2402, when the print button B is tapped, the paired printer may be used.

Thereafter, at the user terminal T2, during execution of the application, pairing with the printer continues and the application screen 2402 continues to be displayed on the display 503. Further, at the user terminal T2, when the application screen 2402 transitions to a home screen 2403, the pairing with the printer is released.

An example of transition to various screens displayed on the display 503 of the user terminal T3 will be described.

Figure 25:
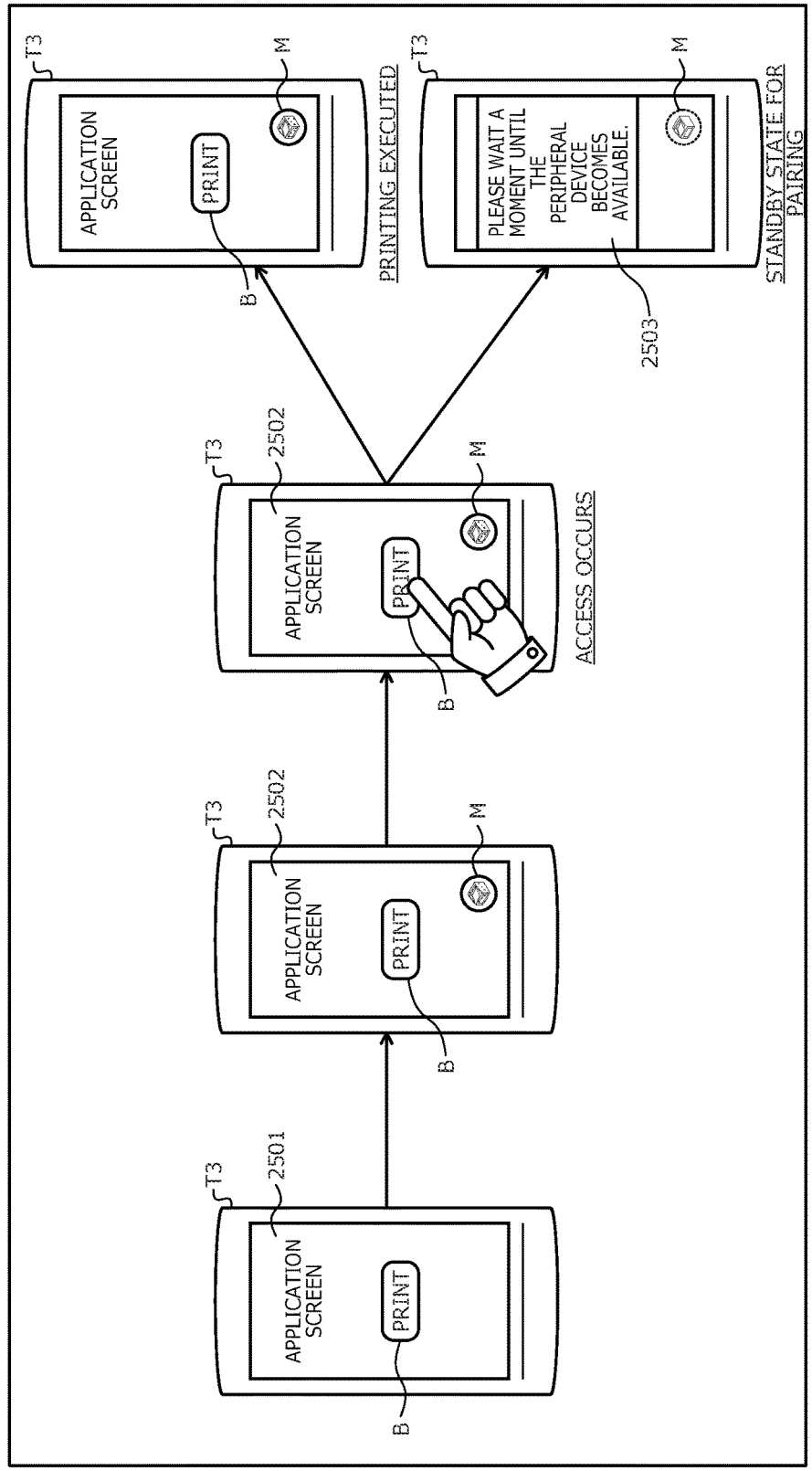
FIG. 25 is a diagram (part 2) of an example of screen transition of the user terminal Ti according to the third embodiment.

FIG. 25 is a diagram (part 2) of an example of screen transition of the user terminal Ti according to the third embodiment. In FIG. 25, an application screen 2501 is an example of a screen displayed on the display 503 at the startup of an application on the user terminal T3.

Here, the user terminal T3 is assumed to detect a printer capable of short-range wireless communication and as a result of transmitting an acquisition request for the pairing information of the printer to the management server 101, the user terminal T3 is further assumed to receive from the management server 101, state information indicating the that printer is being used. In this case, the application screen 2502 is displayed on the display 503 of the user terminal T3.

The application screen 2502 is a screen having the same contents as that of the application screen 2402 depicted in FIG. 24. Through the application screen 2502, even when the user terminal T3 is not paired with the printer, to the user, the printer may be made to appear to be available.

Here, in the application screen 2502, the print button B is assumed to be tapped. In this case, an access request for the printer is issued from the application, and an acquisition request for the pairing information of the printer is transmitted from the user terminal T3 to the management server 101.

Thereafter, the pairing of the user terminal T2 and the printer is released; and the user terminal T3, when receiving the pairing information for the printer from the management server 101, is paired with the printer and printing is executed. On the other hand, without release of the pairing of the user terminal T2 and the printer, when the user terminal T3 receives from the management server 101, state information indicating that the printer is being used, the message 2503 is displayed on the display 503.

Through the message 2503, the user may recognize that since another user terminal is using the printer, the printer cannot be used for a while. At the user terminal T3, after a certain period elapses after the message 2503 is displayed, or when the message 2503 is tapped, an application screen 2601 as depicted in FIG. 26 is displayed on the display 503.

Figure 26:
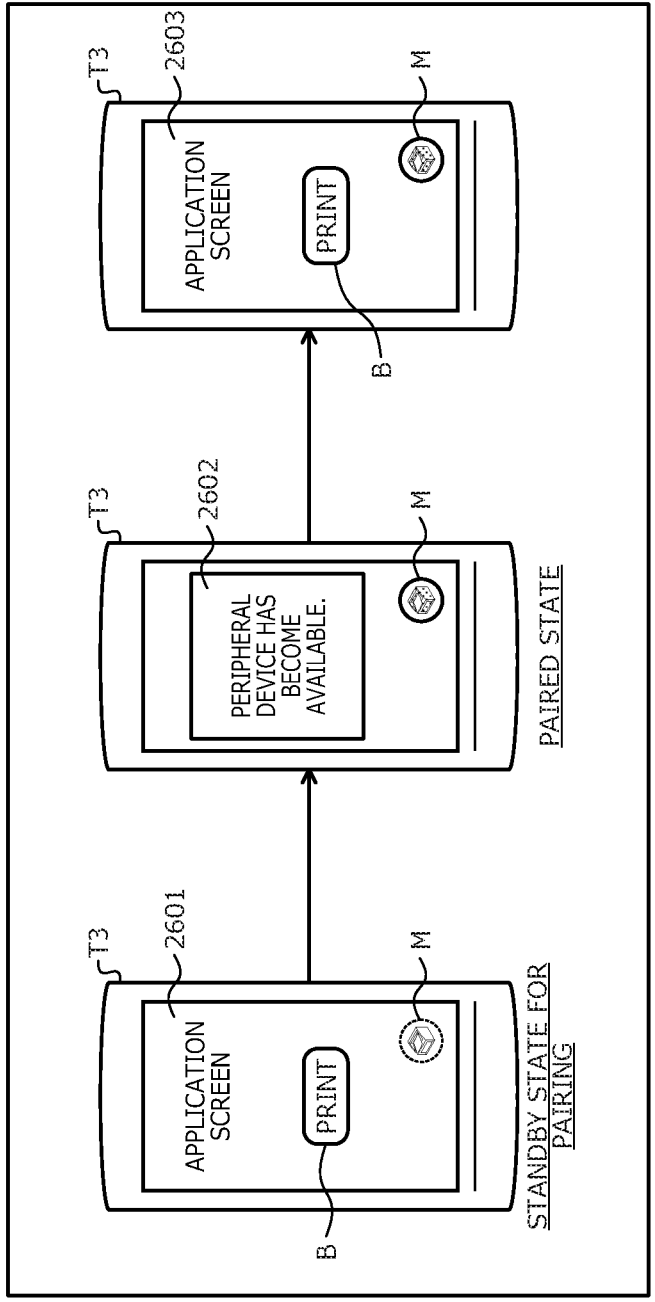
FIG. 26 is a diagram (part 3) of an example of screen transition of the user terminal Ti according to the third embodiment.

FIG. 26 is a diagram (part 3) of an example of screen transition of the user terminal Ti according to the third embodiment. In FIG. 26, an application screen 2601 is an example of a screen displayed on the display 503 when pairing of the user terminal T3 and the printer is awaited. In the application screen 2601, the device icon M representing the printer is displayed grayed out.

Here, the pairing of the user terminal T2 and the printer is assumed to be released, and the pairing information of the printer is assumed to be transmitted from the management server 101 to the user terminal T3. In this case, the user terminal T3 and the printer are paired, and on the display 503 of the user terminal T3, a message 2602 indicating that the printer may be used is displayed and the device icon M is displayed overlaid.

Further, at the user terminal T3, after a certain period of time elapses after the message 2602 is displayed, or when the message 2602 is tapped, an application screen 2603 is displayed on the display 503, enabling use of the printer.

The pairing management process procedure of the user terminal Ti according to the third embodiment will be described.

Figure 27:
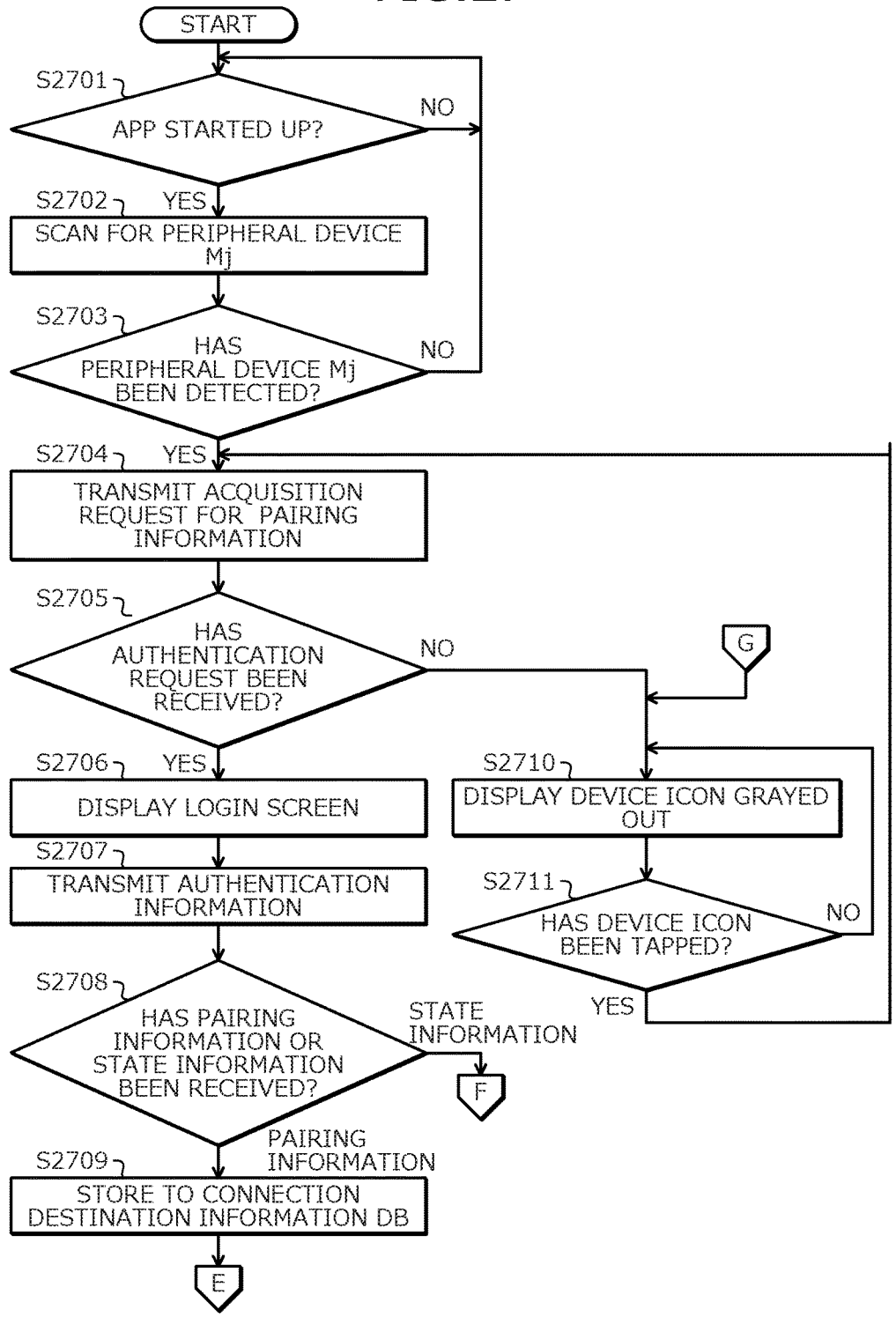
FIG. 27 is a flowchart (part 1) of an example of a first pairing management process procedure of the user terminal Ti according to the third embodiment.
Figure 28:
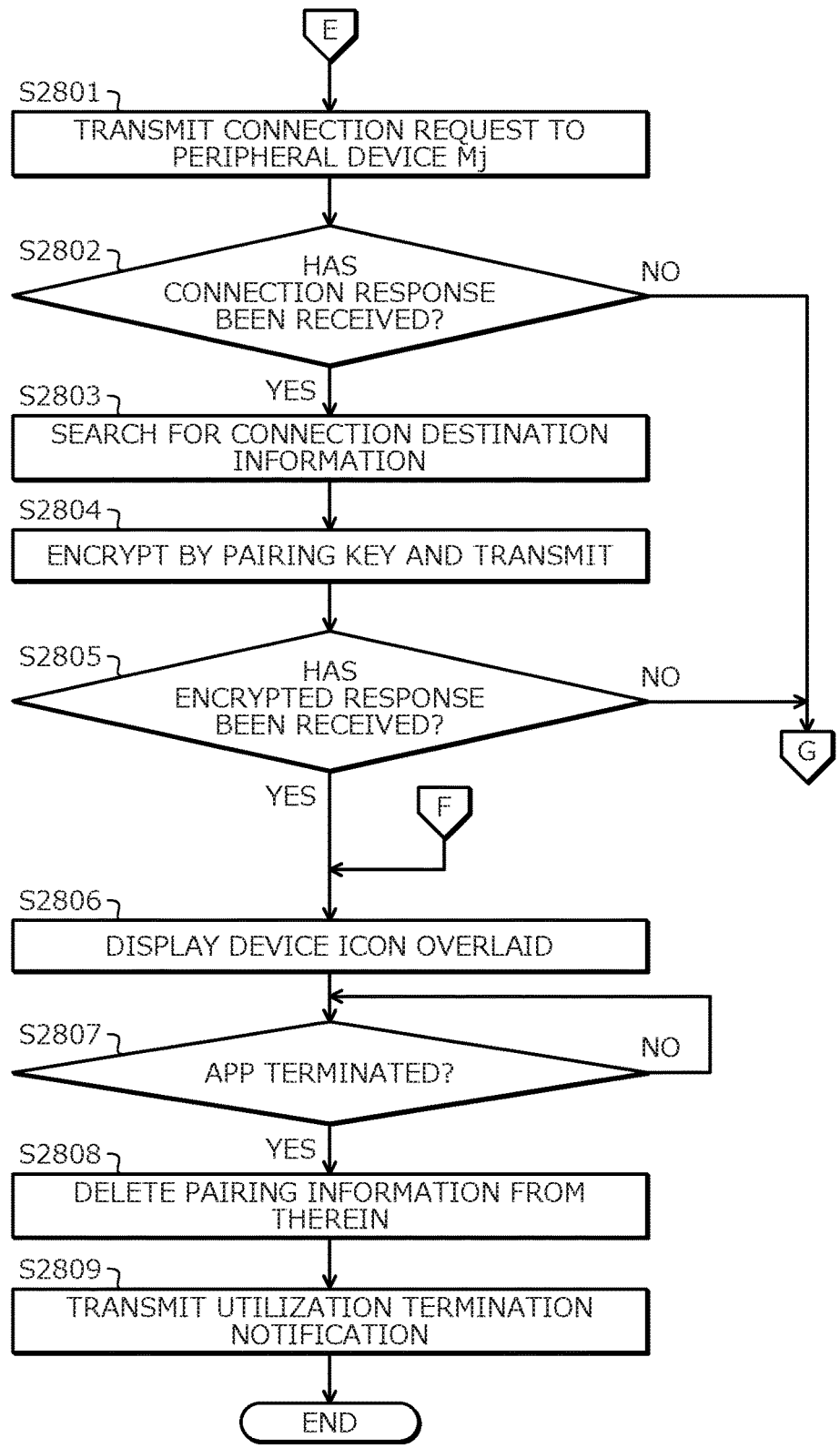
FIG. 28 is a flowchart (part 2) of the example of the first pairing management process procedure of the user terminal Ti according to the third embodiment.

FIGS. 27 and 28 are flowcharts of an example of a first pairing management process procedure of the user terminal Ti according to the third embodiment. In the flowchart depicted in FIG. 27, first, the user terminal Ti determines whether an application has been started up (step S2701). Here, the user terminal Ti stands by until an application is started up (step S2701: NO).

When an application has been started up (step S2701: YES), the user terminal Ti scans for a peripheral device Mj capable of performing short-range wireless communication with the user terminal Ti (step S2702). The user terminal Ti determines whether a peripheral device Mj has been detected (step S2703).

If no peripheral device Mj has been detected (step S2703: NO), the user terminal Ti returns to step S2701. On the other hand, if a peripheral device Mj has been detected (step S2703: YES), the user terminal Ti transmits to the management server 101, an acquisition request for the pairing information of the detected peripheral device Mj (step S2704).

Next, the user terminal Ti determines whether an authentication request has been received from the management server 101 (step S2705). If an authentication request has been received (step S2705: YES), the user terminal Ti displays a login screen on the display 503 (step S2706). The user terminal Ti, when authentication information is input into the login screen, transmits the input authentication information to the management server 101 (step S2707).

Next, the user terminal Ti determines whether pairing information associated with the transmitted acquisition request or state information indicating that the peripheral device Mj is being used has been received from the management server 101 (step S2708). If state information indicating that the peripheral device Mj is being used has been received (step S2708: state information), the user terminal Ti transitions to step S2806 depicted in FIG. 28.

On the other hand, if the pairing information has been received (step S2708: pairing information), the user terminal Ti stores the received pairing information into the connection destination information DB 350 as connection destination information (step S2709), and transitions to step S2801 depicted in FIG. 28.

At step S2705, if no authentication request has been received (step S2705: NO), the user terminal Ti displays a device icon representing the peripheral device Mj grayed out on the display 503 (step S2710). The user terminal Ti determines whether the device icon has been tapped (step S2711).

If the device icon has not been tapped (step S2711: NO), the user terminal Ti returns to step S2710. On the other hand, if the device icon has been tapped (step S2711: YES), the user terminal Ti returns to step S2704.

In the flowchart depicted in FIG. 28, first, the user terminal Ti transmits a connection request to the detected peripheral device Mj (step S2801). The user terminal Ti determines whether a connection response (pairing requirement) for the connection request has been received from the peripheral device Mj (step S2802).

If no connection response has been received (step S2802: NO), the user terminal Ti returns to step S2710 depicted in FIG. 27. On the other hand, if a connection response has been received (step S2802: YES), the user terminal Ti searches the connection destination information DB 350 for connection destination information, using the device address of the peripheral device Mj as a key (step S2803).

The user terminal Ti sets the terminal address included in the retrieved connection destination information as the transmission source address of a communication packet, encrypts the communication packet by the pairing key included in the connection destination information, and transmits the encrypted communication packet to the peripheral device Mj (step S2804).

The user terminal Ti determines whether a response encrypted by the shared pairing key has been received from the peripheral device Mj (step S2805). If no response encrypted by the shared pairing key has been received (step S2805: NO), the user terminal Ti returns to step S2710 depicted in FIG. 27.

On the other hand, if a response encrypted by the shared pairing key has been received (step S2805: YES), the user terminal Ti displays a device icon representing the peripheral device Mj overlaid on the display 503 (step S2806). The user terminal Ti determines whether the application has been terminated (step S2807).

Here, the user terminal Ti stands by until the application is terminated (step S2807: NO). When the application has been terminated (step S2807: YES), the user terminal Ti deletes, from therein, the pairing information associated with the device (step S2808). The user terminal Ti transmits utilization termination notification concerning the peripheral device Mj to the management server 101 (step S2809), ending a series of operations according to the present flowchart.

As a result, when the peripheral device Mj is not being used, the pairing information of the peripheral device Mj is acquired from the management server 101, enabling pairing with the peripheral device Mj. Further, when the peripheral device Mj is being used by another user terminal, even though the user terminal Ti is not paired with the peripheral device Mj, the device icon M is displayed overlaid, enabling the peripheral device Mj to be made to appear to be usable to the user.

The pairing management process procedure of the user terminal Ti will be described for a case in which at the user terminal Ti, an access request for a peripheral device Mj is issued by an application under execution (e.g., corresponds to process procedure of the user terminal T3 in the first switching example depicted in FIG. 21).

Figure 29:
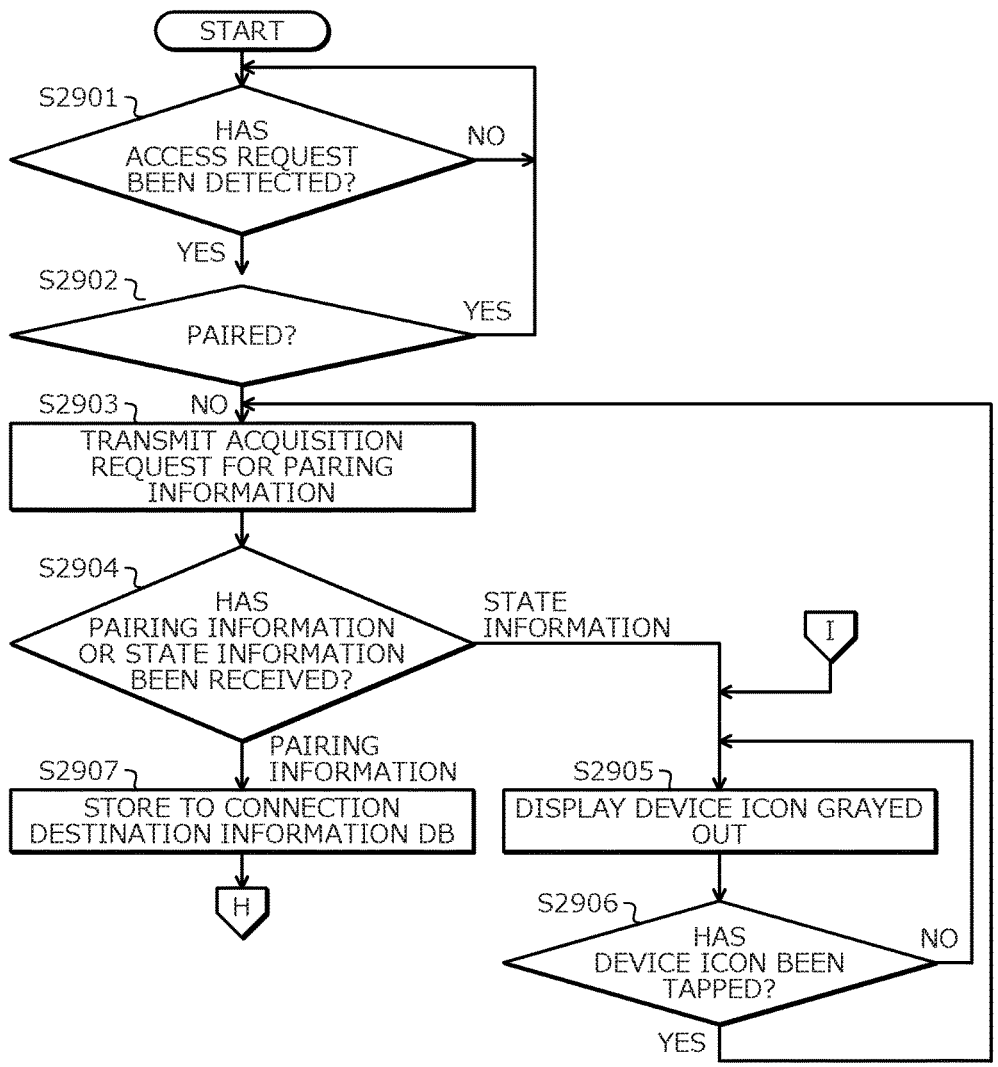
FIG. 29 is a flowchart (part 1) of an example of a second pairing management process procedure of the user terminal Ti according to the third embodiment.

FIGS. 29 and 30 are flowcharts of an example of a second pairing management process procedure of the user terminal Ti according to the third embodiment. In the flowchart depicted in FIG. 29, first, the user terminal Ti determines whether an access request from an application has been detected for a peripheral device Mj (step S2901). Here, the user terminal Ti stands by until an access request from an application is detected for a peripheral device Mj (step S2901: NO).

When an access request has been detected (step S2901: YES), the user terminal Ti determines whether pairing with the peripheral device Mj has been completed (step S2902). If pairing with the peripheral device Mj has been completed (step S2902: YES), the user terminal Ti returns to step S2901.

On the other hand, if pairing with the peripheral device Mj has not been completed (step S2902: NO), the user terminal Ti transmits to the management server 101, an acquisition request for the pairing information of the peripheral device Mj (step S2903).

The user terminal Ti determines whether pairing information associated with the transmitted acquisition request or state information indicating that the peripheral device Mj is being used has been received from the management server 101 (step S2904).

If state information indicating that the peripheral device Mj is being used has been received (step S2904: state information), the user terminal Ti displays a device icon representing the peripheral device Mj on the display 503 grayed out (step S2905). The user terminal Ti determines whether the device icon has been tapped (step S2906).

If the device icon has not been tapped (step S2906: NO), the user terminal Ti returns to step S2905. On the other hand, if the device icon has been tapped (step S2906: YES), the user terminal Ti returns to step S2903.

At step S2904, if the pairing information has been received (step S2904: pairing information), the user terminal Ti stores the received pairing information into the connection destination information DB 350 as connection destination information (step S2907), and transitions to step S3001 depicted in FIG. 30.

In the flowchart depicted in FIG. 30, first, the user terminal Ti transmits a connection request to the peripheral device Mj (step S3001). The user terminal Ti determines whether a connection response (pairing requirement) for the connection request has been received from the peripheral device Mj (step S3002).

If no connection response has been received (step S3002: NO), the user terminal Ti returns to step S2905 depicted in FIG. 29. On the other hand, if a connection response has been received (step S3002: YES), the user terminal Ti searches the connection destination information DB 350 for connection destination information, using the device address of the peripheral device Mj as a key (step S3003).

The user terminal Ti sets the terminal address included in the retrieved connection destination information as the transmission source address of a communication packet, encrypts the communication packet by the pairing key included in the connection destination information, and transmits the encrypted communication packet to the peripheral device Mj (step S3004).

The user terminal Ti determines whether a response encrypted by the shared pairing key has been received from the peripheral device Mj (step S3005). If no response encrypted by the shared pairing key has been received (step S3005: NO), the user terminal Ti returns to step S2905 depicted in FIG. 29.

On the other hand, if a response encrypted by the shared pairing key has been received (step S3005: YES), the user terminal Ti displays a device icon representing the peripheral device Mj overlaid on the display 503 (step S3006). The user terminal Ti accesses the peripheral device Mj in response to the access request detected at step S2901 depicted in FIG. 29 (step S3007), ending a series of operations according to the present flowchart.

As a result, when access from the application to the peripheral device Mj occurs, if the user terminal Ti is not paired with the peripheral device Mj, an acquisition request for the pairing information of the peripheral device Mj is again transmitted to the management server 101. Further, even when an acquisition request for the pairing information is again transmitted, if the peripheral device Mj is being used by another user terminal, the device icon M may be displayed grayed out and notification of standby until the peripheral device Mj becomes available may be given to the user.

The pairing management process procedure of the user terminal Ti will be described for a case in which a pairing release request is received from the management server 101 (e.g., corresponds to the process procedure of the user terminal T2 in the first switching example depicted in FIG. 21).

FIG. 31 is a flowchart of an example of a third pairing management process procedure of the user terminal Ti according to the third embodiment. In the flowchart depicted in FIG. 31, first, the user terminal Ti determines whether a pairing release request has been received from the management server 101 (step S3101).

Here, the user terminal Ti stands by until a pairing release request is received from the management server 101 (step S3101: NO). When a pairing release request has been received (step S3101: YES), the user terminal Ti determines whether the user terminal Ti is paired with the peripheral device Mj (step S3102).

If the user terminal Ti is not paired with the peripheral device Mj (step S3102: NO), the user terminal Ti transmits notification of pairing release completion to the management server 101 (step S3103), ending a series of operations according the present flowchart.

On the other hand, if the user terminal Ti is paired with the peripheral device Mj (step S3102: YES), the user terminal Ti determines whether an application screen is active (step S3104). If an application screen is active (step S3104: YES), the user terminal Ti transmits to the management server 101, notification that pairing release is impossible (step S3105), ending a series of operations according to the present flowchart.

On the other hand, if no application screen is active (step S3104: NO), the user terminal Ti releases the pairing with the peripheral device Mj (step S3106). The user terminal Ti transmits notification of pairing release completion to the management server 101 (step S3107), ending a series of operations according to the present flowchart.

As a result, in response to the pairing release request from the management server 101, the user terminal Ti may determine whether release of pairing with the peripheral device Mj is possible. Further, when release of the pairing with the peripheral device Mj is possible, the pairing with the peripheral device Mj may be released and notification of pairing release completion may be transmitted to the management server 101.

As described above, according to the user terminal Ti of the third embodiment, an acquisition request for the pairing information of the peripheral device Mj may be transmitted to the management server 101 at the startup of an application at the user terminal Ti.

Further, according to the user terminal Ti, even when state information indicating that the peripheral device Mj is being used is received in response to the transmitted acquisition request, the device icon M may be displayed overlaid. As a result, even when the user terminal Ti is not paired with the peripheral device Mj, the peripheral device Mj may be made to appear to be usable to the user.

Further, according to the user terminal Ti, an acquisition request may be again transmitted to the management server 101 if the user terminal Ti is not paired with the peripheral device Mj when an access request from the application to the peripheral device Mj is detected. As a result, when the user terminal Ti actually attempts to use the peripheral device Mj, acquisition of the pairing information of the peripheral device Mj may be attempted again.

Further, according to the user terminal Ti, whether release of the pairing with a peripheral device Mj may be determined when a pairing release request is received from the management server 10. Further, according to the user terminal Ti, if release of the pairing with the peripheral device Mj is possible, the pairing with the peripheral device Mj may be released and notification of pairing release completion may be transmitted to the management server 101.

Thus, according to the pairing management system 300 of the third embodiment, when multiple user terminals attempt to use the peripheral device Mj simultaneously, the management server 101 performs arbitration, enabling the user terminal that is to use the peripheral device Mj to be switched. As a result, a state such as when multiple user terminals use the peripheral device Mj may be avoided.

The pairing management method described in the present embodiments may be realized by executing on a personal computer, a work station, or the like, a prepared program. The pairing management program may be stored to computer readable recording medium such as a hard disk, a flexible disk, CD-ROM, MO, DVD, or the like and may be executed by being read out from the recording medium by a compute. Further, the pairing management program may be distributed via a network such as the Internet or the like.

Nonetheless, with the conventional techniques, in business-use standardized to a certain extent, the pairing operation itself becomes a troublesome task, leading to decreases in work efficiency.

According to one aspect of the present invention, an effect is achieved in that pairing of a terminal apparatus and a peripheral device may be performed efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A pairing management method comprising:
   detecting, by a first computer, a peripheral device configured to perform short-range wireless communication with the first computer;
   executing, by the first computer, a pairing process with the peripheral device;
   transmitting, by the first computer to a server, pairing information generated by the pairing process;
   detecting, by a second computer, the peripheral device configured to perform short-range wireless communication with the second computer;
   acquiring, by the second computer reading a code when a read instruction is received for the code printed on a seal affixed to the peripheral device, identification information uniquely identifying the peripheral device;
   transmitting, by the second computer, to the server storing the pairing information generated by the pairing process of the first computer and the peripheral device, an acquisition request for the pairing information of the peripheral device identified by the identification information; and
   performing data communication, by the second computer, with the peripheral device based on the pairing information, when the pairing information associated with the transmitted acquisition request is received from the server.

2. The pairing management method according to claim 1, wherein the pairing information generated by the pairing process includes an address of the first computer and an encryption key generated by the pairing process.

3. The pairing management method according to claim 2, comprising transmitting, by the second computer, a key update request to the server, the key update request being transmitted when the encryption key of the peripheral device is updated during the data communication with the peripheral device, the key update request including the encryption key after updating.

4. The pairing management method according to claim 1, comprising:
   transmitting, by the second computer, authentication information of the second computer or of a user of the second computer, when an authentication request is received from the server; and
   receiving, by the second computer, the pairing information associated with the acquisition request, when the second computer or the user of the second computer is authenticated based on the transmitted authentication information.

5. The pairing management method according to claim 1, further comprising determining, by the second computer, whether the pairing information associated with the peripheral device is stored in a storage unit storing therein the pairing information received from the server, the determining being performed when the peripheral device configured to perform short-range wireless communication with the second computer is detected, wherein the transmitting of the acquisition request includes transmitting to the server, the acquisition request for the pairing information of the peripheral device, when the pairing information associated with the peripheral device is not stored in the storage unit.

6. The pairing management method according to claim 5, wherein the performing the data communication with the peripheral device includes performing the data communication based on the pairing information associated with the peripheral device stored in the storage unit, when the pairing information associated with the peripheral device is stored in the storage unit.

7. A non-transitory, computer-readable recording medium storing therein a pairing management program that causes a first computer and a second computer to execute a process comprising:
  detecting, by the first computer, a peripheral device configured to perform short-range wireless communication with the first computer;
  transmitting, by the first computer to a server, pairing information generated by a pairing process
  detecting, by a second computer, the peripheral device configured to perform short-range wireless communication with the second computer;
  acquiring, by the second computer reading a code when a read instruction is received for the code printed on a seal affixed to the peripheral device, identification information uniquely identifying the peripheral device;
  transmitting, by the second computer, to the server storing the pairing information generated by the pairing process of the first computer and the peripheral device, an acquisition request for the pairing information of the peripheral device identified by the identification information; and
  performing, by the second computer, data communication with the peripheral device based on the pairing information, when the pairing information associated with the transmitted acquisition request is received from the server.

8. A pairing management system managing pairing with a peripheral device, comprising:
  a server;
  a first computer configured to:
    detect the peripheral device configured to perform short-range wireless communication with the first computer,
    execute a pairing process with the peripheral device, and
    transmit pairing information, generated by the pairing process, to the server; and
  a second computer configured to:
    detect the peripheral device configured to perform short-range wireless communication with the second computer,
    acquire, by the second computer reading a code when a read instruction is received for the code printed on a seal affixed to the peripheral device, identification information uniquely identifying the peripheral device;
    transmit, to the server storing pairing information generated by the pairing process of the first computer and the peripheral device, an acquisition request for the pairing information of the peripheral device identified by the identification information, and
    perform data communication with the peripheral device based on the pairing information, when the pairing information associated with the transmitted acquisition request is received from the server.

9. A pairing management method comprising:
  detecting, by a first computer, a peripheral device configured to perform short-range wireless communication with the first computer;
  executing, by the first computer, a pairing process with the peripheral device;
  transmitting, by the first computer to a server, pairing information generated by the pairing process;
  detecting, by a second computer when an application is started at the second computer, the peripheral device configured to perform short-range wireless communication with the second computer;
  transmitting, by the second computer, to the server storing the pairing information generated by the pairing process of the first computer and the peripheral device, an acquisition request for the pairing information;
  displaying, by the second computer, an icon representing that use of the peripheral device is possible, the icon being displayed when state information indicating that the peripheral device is being used is received from the server in response to transmission of the acquisition request;
  retransmitting the acquisition request to the server, by the second computer, upon detection of an access request from the application to the peripheral device; and
  performing data communication, by the second computer, with the peripheral device based on the pairing information, when the pairing information associated with the transmitted acquisition request is received from the server.

10. A non-transitory, computer-readable recording medium storing therein a pairing management program that causes a first computer and a second computer to execute a process comprising:
  detecting, by the first computer, a peripheral device configured to perform short-range wireless communication with the first computer;
  transmitting, by the first computer to a server, pairing information generated by a pairing process
  detecting, by a second computer when an application is started at the second computer, the peripheral device configured to perform short-range wireless communication with the second computer;
  transmitting, by the second computer, to the server storing the pairing information generated by the pairing process of the first computer and the peripheral device, an acquisition request for the pairing information;
  displaying, by the second computer, an icon representing that use of the peripheral device is possible, the icon being displayed when state information indicating that the peripheral device is being used is received from the server in response to transmission of the acquisition request;
  retransmitting the acquisition request to the server, by the second computer, upon detection of an access request from the application to the peripheral device; and
  performing, by the second computer, data communication with the peripheral device based on the pairing information, when the pairing information associated with the transmitted acquisition request is received from the server.

11. A pairing management system managing pairing with a peripheral device, comprising:
  a server;
  a first computer configured to:

detect the peripheral device configured to perform short-range wireless communication with the first computer, execute a pairing process with the peripheral device, and transmit pairing information, generated by the pairing process, to the server; and a second computer configured to:

detect the peripheral device configured to perform short-range wireless communication with the second computer when an application is started at the second computer, transmit, to the server storing pairing information generated by the pairing process of the first computer and the peripheral device, an acquisition request for the pairing information, display, by the second computer, an icon representing that use of the peripheral device is possible, the icon being displayed when state information indicating that the peripheral device is being used is received from the server in response to transmission of the acquisition request;

retransmit the acquisition request to the server, by the second computer, upon detection of an access request from the application to the peripheral device and perform data communication with the peripheral device based on the pairing information, when the pairing information associated with the transmitted acquisition request is received from the server.

* * * * *